(12) United States Patent
Asanuma

(10) Patent No.: US 6,350,556 B1
(45) Date of Patent: Feb. 26, 2002

(54) METHOD OF FORMING THIN FILM PATTERN AND POLE PORTION OF THIN FILM MAGNETIC HEAD

(75) Inventor: Yuji Asanuma, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/343,546

(22) Filed: Jun. 30, 1999

(30) Foreign Application Priority Data

Jun. 30, 1998 (JP) ............................................. 10-185262

(51) Int. Cl.$^7$ ............................. G03F 7/00; B05D 5/12
(52) U.S. Cl. ....................... 430/313; 430/312; 430/314; 430/320; 430/324; 427/128; 360/313
(58) Field of Search ................................. 430/312, 313, 430/314, 320, 324; 427/128; 360/313

(56) References Cited

U.S. PATENT DOCUMENTS

| 4,315,985 A | * | 2/1982 | Castellani | .................... 430/314 |
| 4,454,014 A | * | 6/1984 | Biscoff | ................... 204/129.65 |
| 5,438,747 A | | 8/1995 | Krounbi et al. | ................ 29/603 |
| 5,759,914 A | * | 6/1998 | Park | ............................ 438/624 |
| 5,930,672 A | * | 7/1999 | Yamamoto | ................... 438/637 |

FOREIGN PATENT DOCUMENTS

JP 4-196135 * 7/1992

* cited by examiner

Primary Examiner—Mark F. Huff
Assistant Examiner—Nicole Barreca
(74) Attorney, Agent, or Firm—Oliff & Berridge, PLC

(57) ABSTRACT

Upon forming a metal film pattern having a desired shape, a first resist frame having a shape corresponding to said desired pattern is first formed on a substrate at least a surface of which is electrically conductive, a metal-plated film is deposited around the first resist frame by an electroplating process using the electrically conductive surface of the substrate as an electrode, and then said first resist frame is removed while said metal-plated film is remained to form, in the metal-plated film, a depressed portion having a shape which is a duplication of the pattern of the first resist frame. After forming, on the metal-plated film, a second resist frame having an opening which is communicated with said depressed portion, a metal film is formed by plating within a space defined by the depressed portion and the opening. Said metal-plated film is made of a material different from the metal film, and after forming the metal film, the second resist frame is removed, and then the metal-plated film is removed by a process which does not etch out the metal film but selectively etches the metal-plated film. In this way, the metal film having a very small width in the order of submicron, a high aspect ratio and vertical side walls can be accurately formed. Such a metal film is particularly preferably used as a magnetic film to form a pole portion of an inductive type thin film magnetic head.

38 Claims, 17 Drawing Sheets

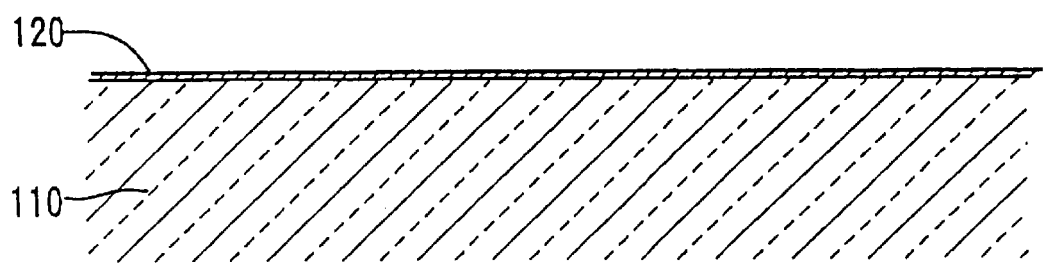
FIG_1
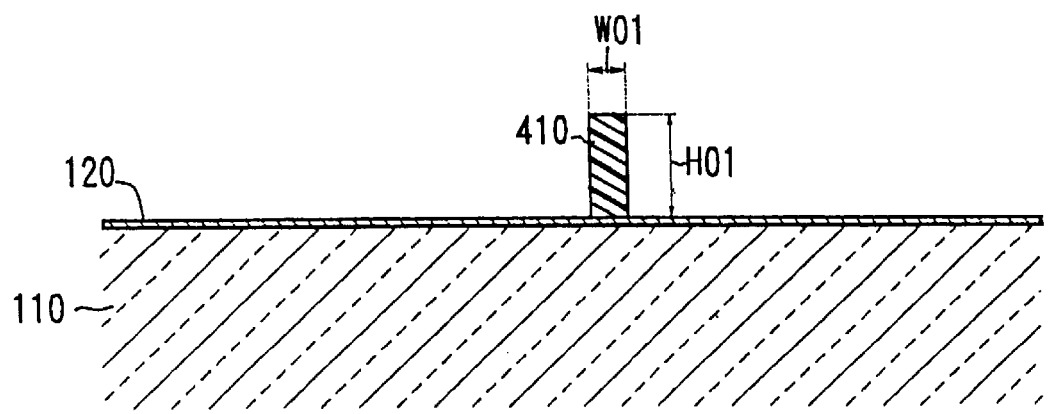
FIG_2

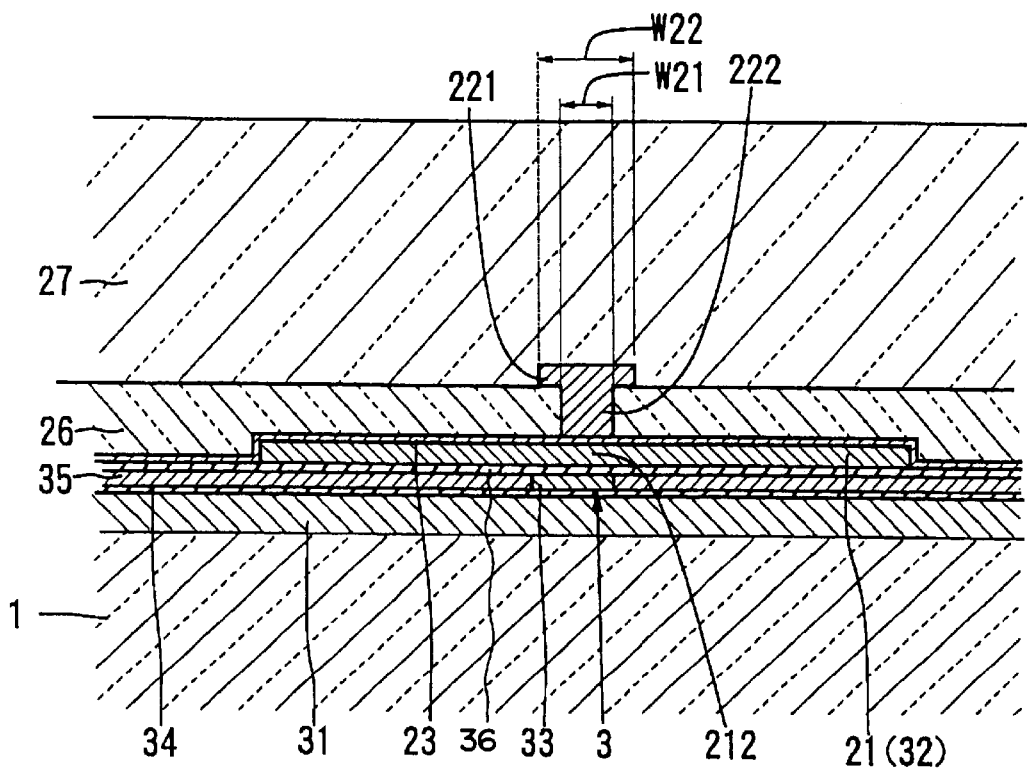
FIG_10
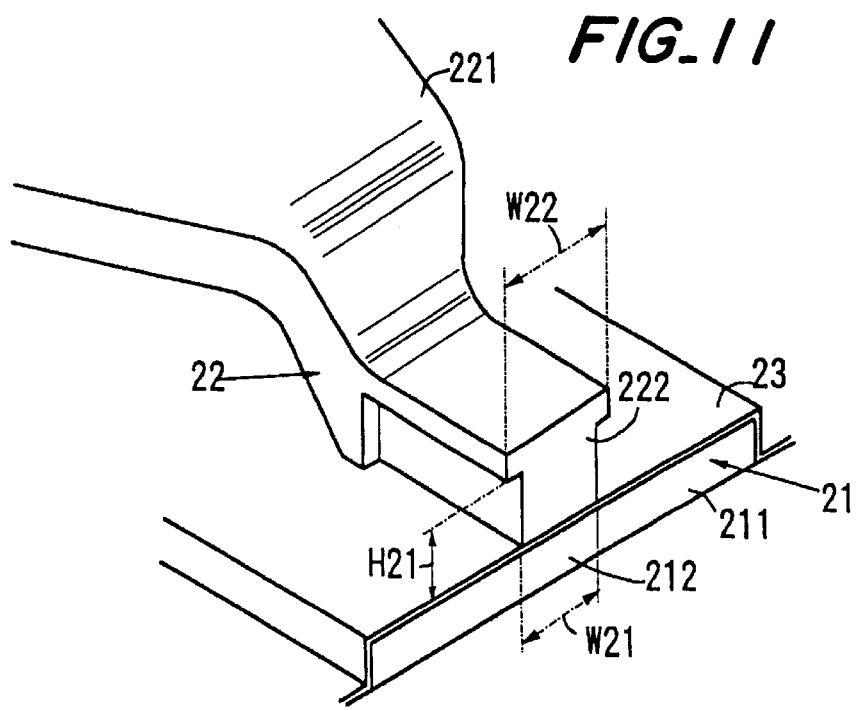
FIG_11

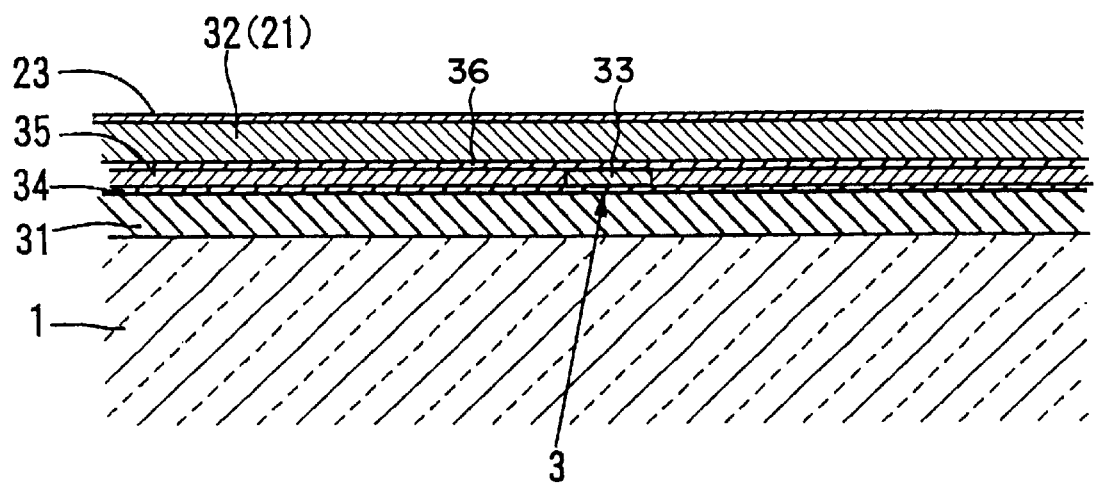
FIG_12
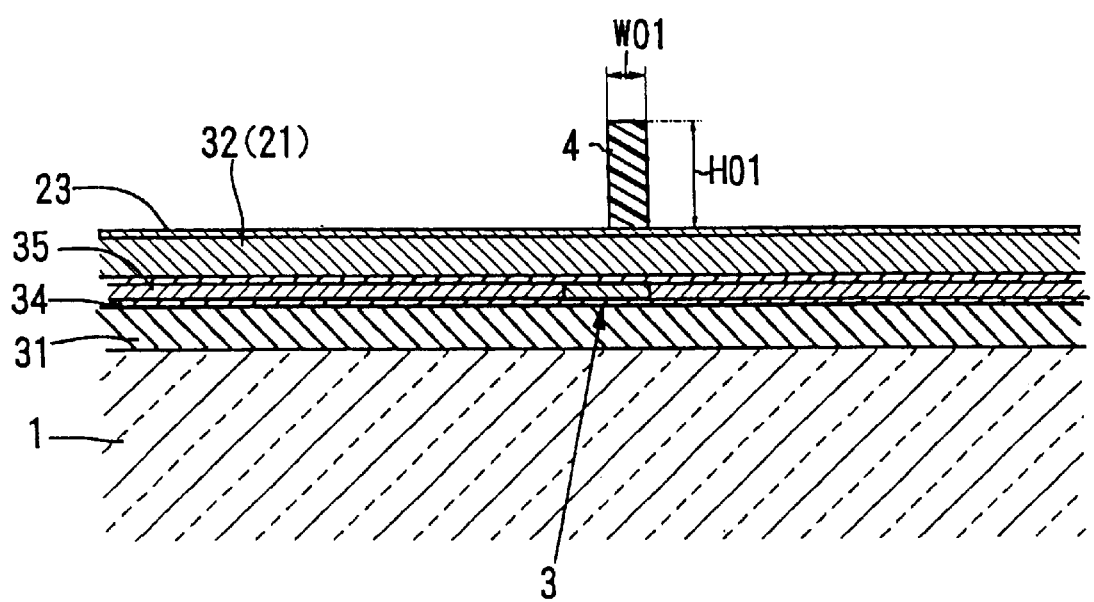
FIG_13

FIG_14
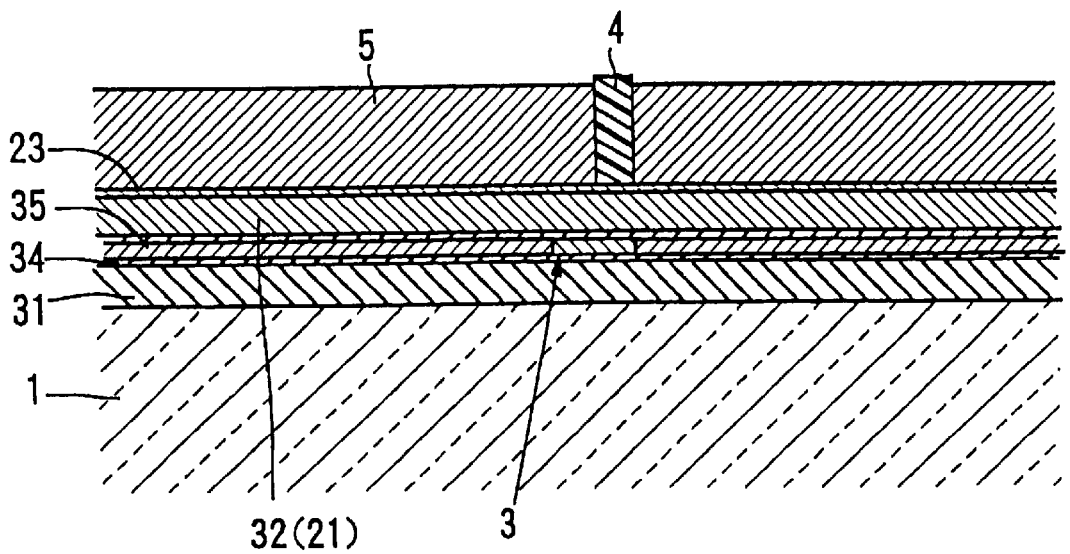
FIG_15
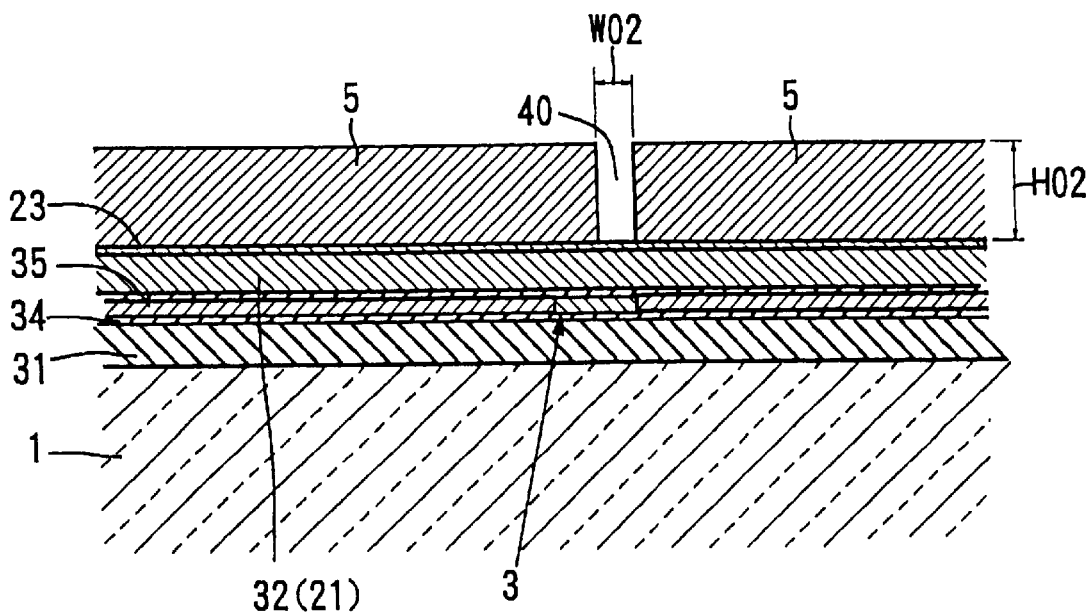

FIG_16
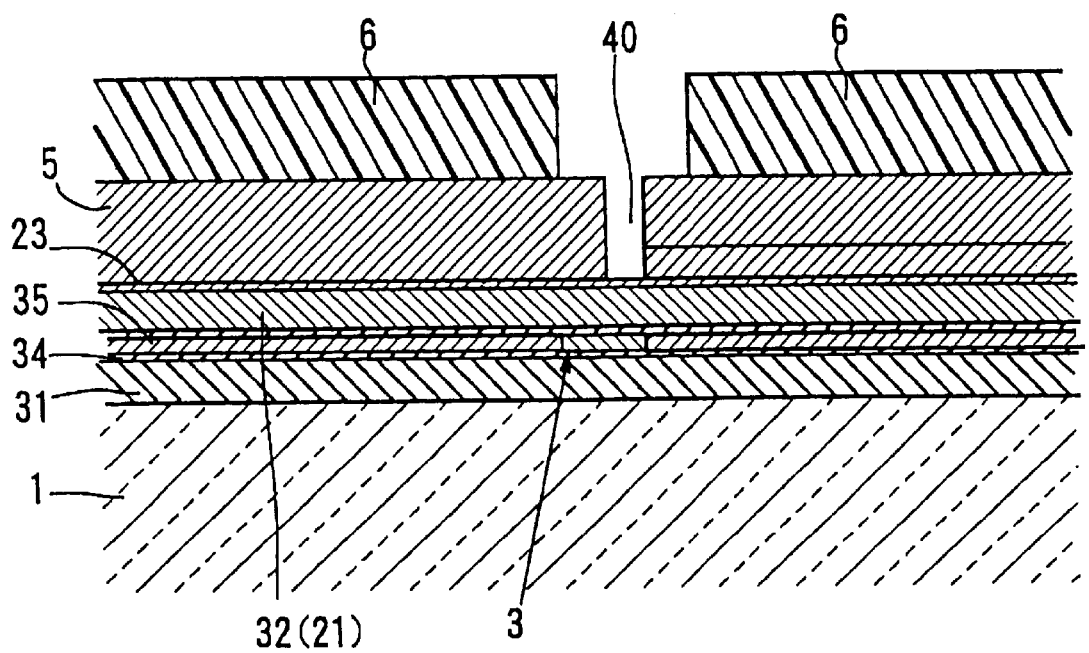
FIG_17
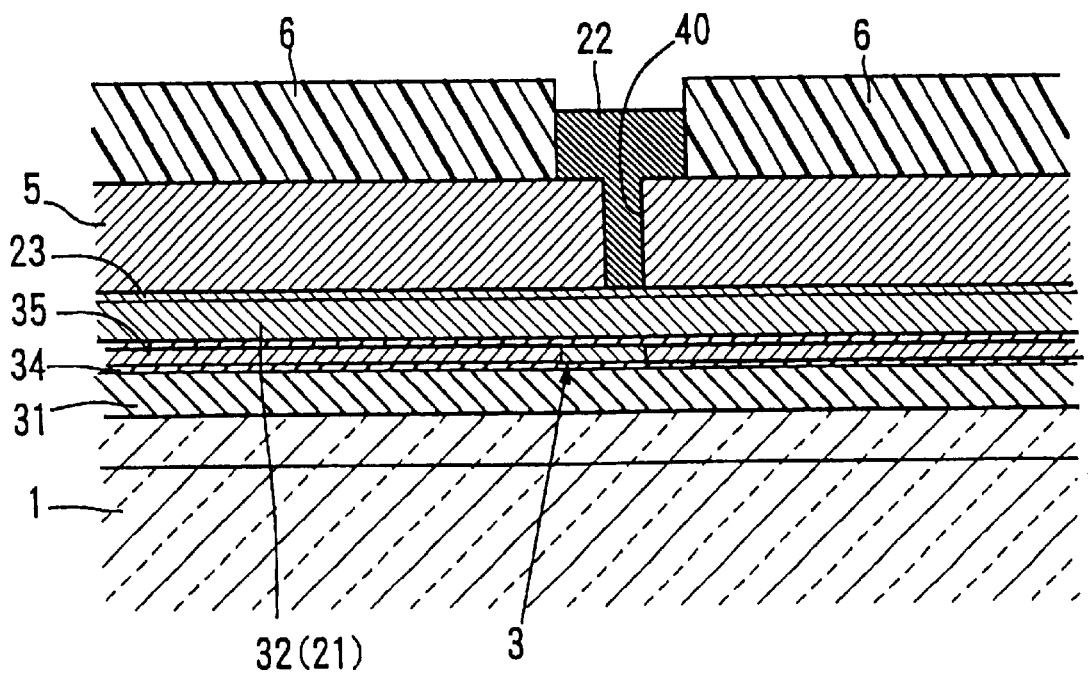

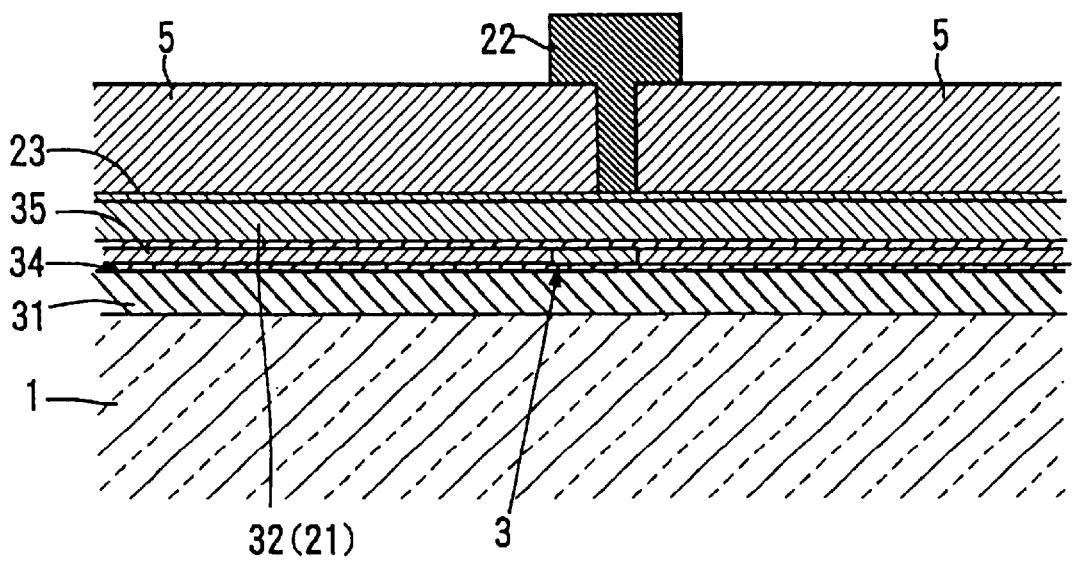
FIG_18
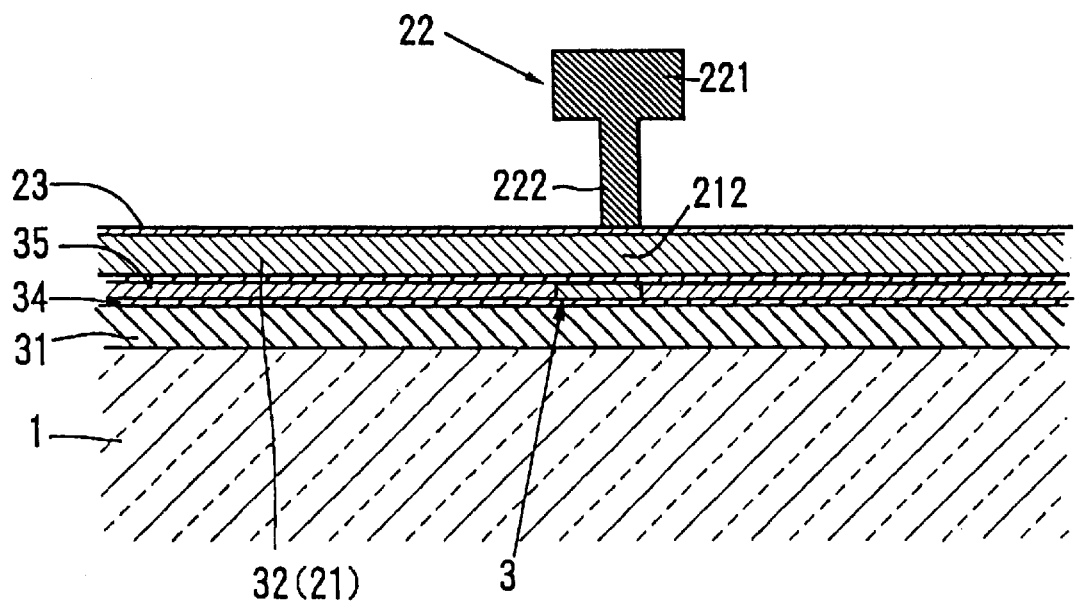
FIG_19

FIG._21
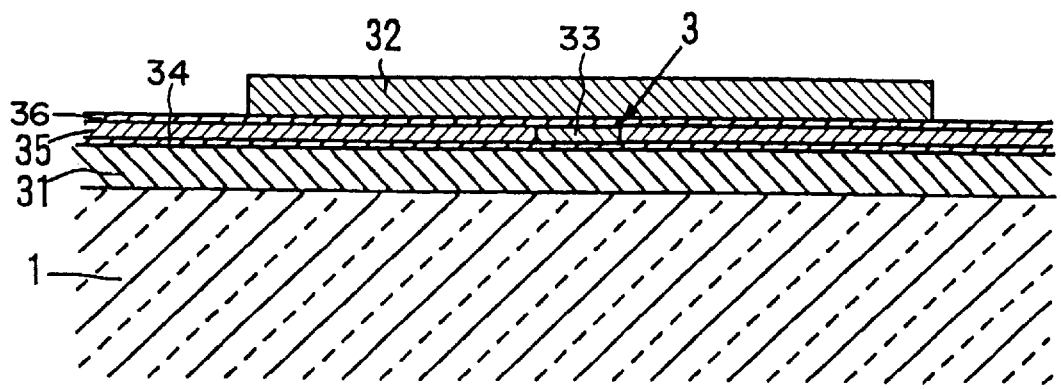
FIG._22
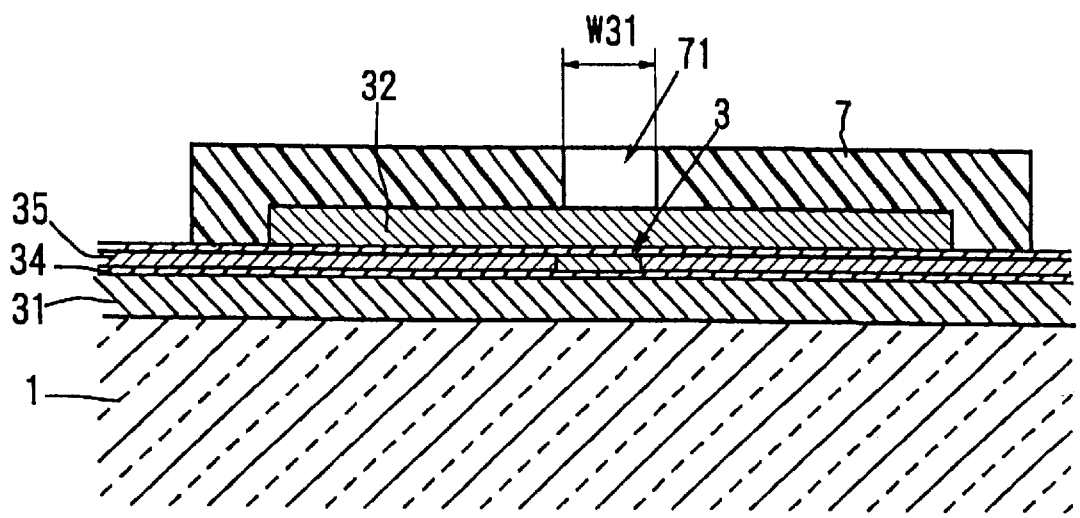

FIG_29
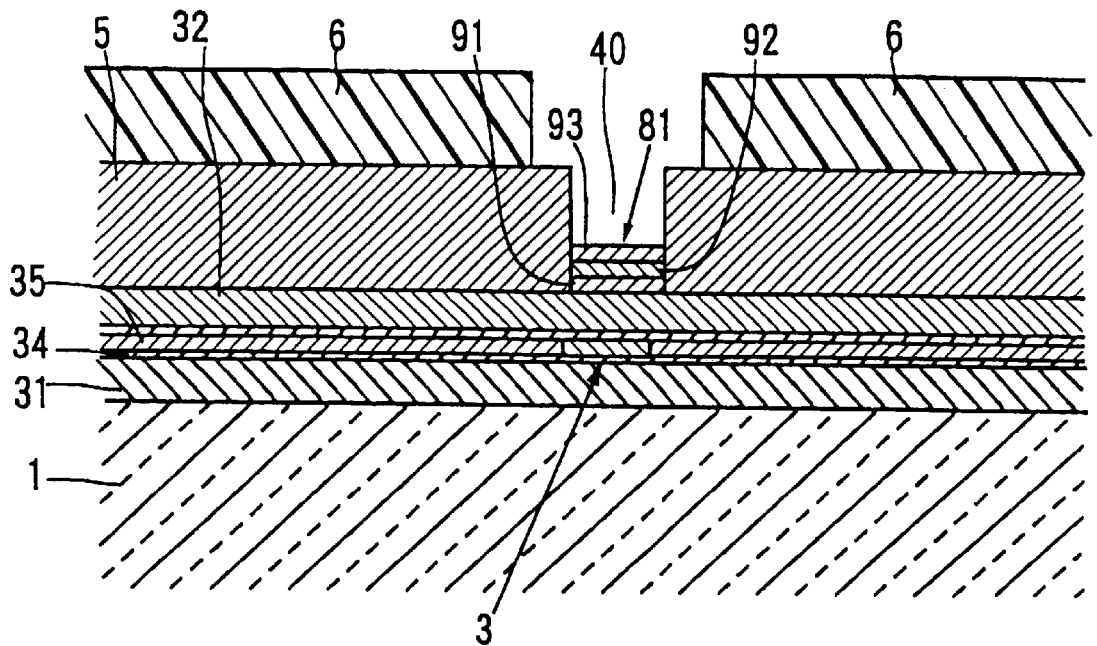
FIG_30
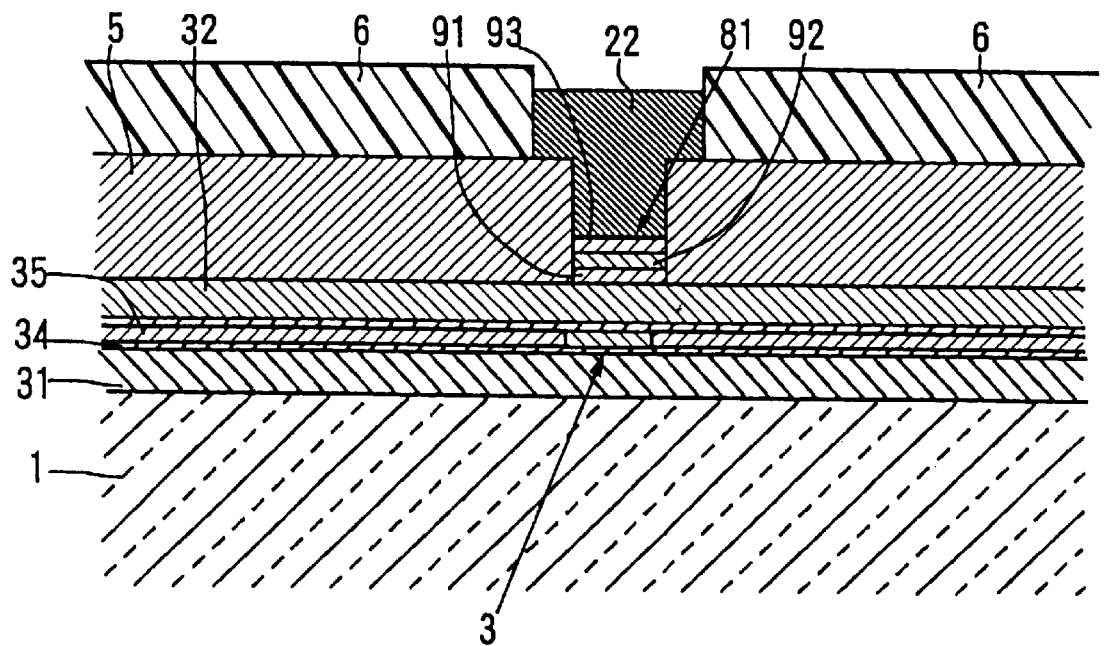

FIG_31
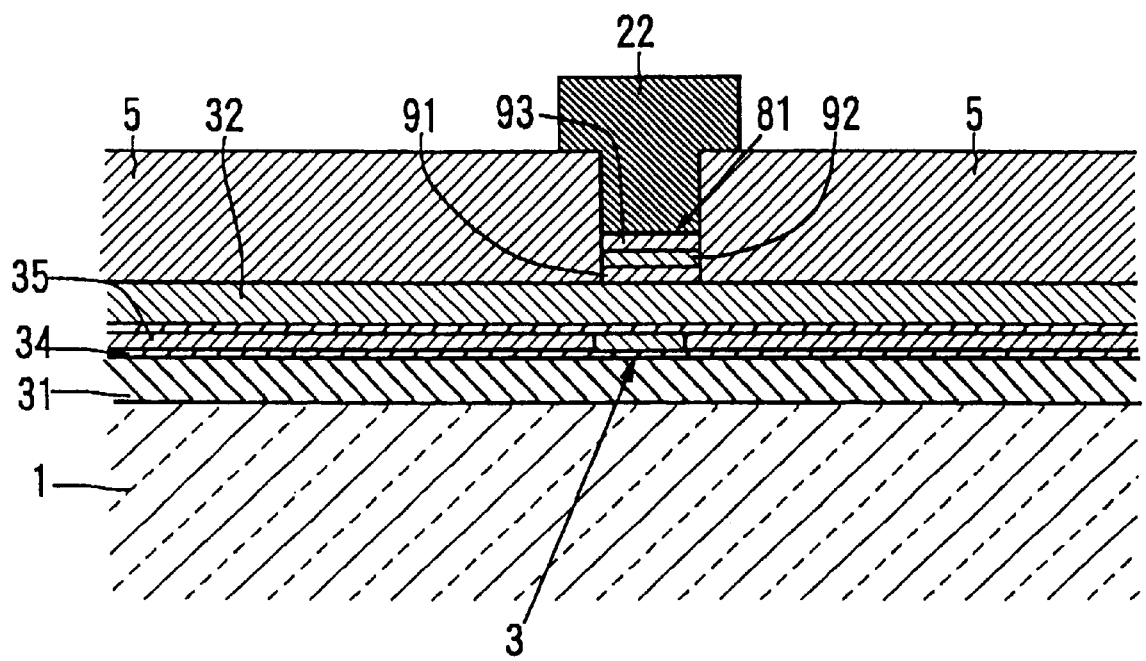
FIG_32
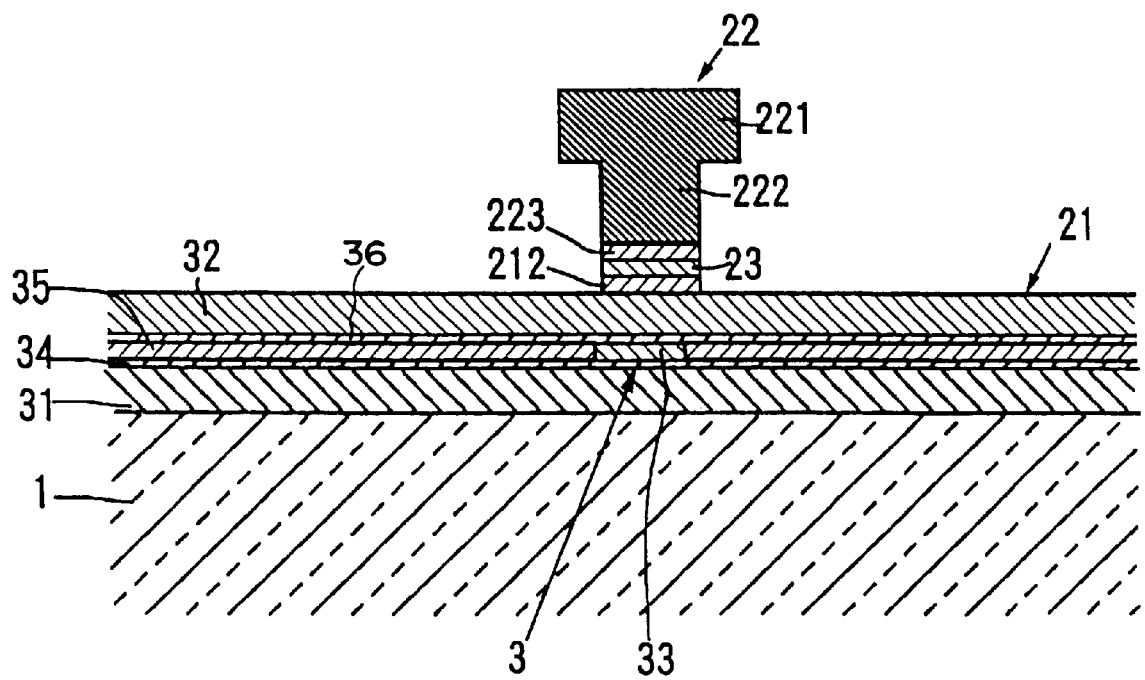

METHOD OF FORMING THIN FILM PATTERN AND POLE PORTION OF THIN FILM MAGNETIC HEAD

BACKGROUND OF THE INVENTION

1. Field of the Invention

The present invention relates to a method of forming a thin film pattern, and particularly to a method of forming a metal film having a fine pattern. Furthermore, the present invention relates to a method of manufacturing a thin film magnetic head having an inductive type thin film magnetic head element, and particularly to a method of forming a pole portion of an inductive type thin film magnetic head element.

2. Description of Related Art

A method of forming a thin film pattern of the present invention can be applied to formation of a high-density wiring pattern in various circuit elements, integrated circuits and the like. Sine the method is particularly suitable for forming a pole portion of an inductive type thin film magnetic head element which is faced to a magnetic record medium, a method of forming such a pole portion will be described in the following. In a thin film magnetic head used in a magnetic disk unit constituting a storage in a computer, a combination type thin film magnetic head in which an inductive type thin film magnetic head element is used as a writing element and a magnetoresistive element (MR element) is used as a reading element has made the main current.

In a combination type thin film magnetic head including a writing inductive type thin film magnetic head element stacked on a reading MR element, the inductive type thin film magnetic head comprises a bottom magnetic film serving also as a top shield for the MR reading element, a gap film, a gap film, a top magnetic film, a thin film coil supported by an insulating film made of an organic resin, and the like.

The end portions of the bottom magnetic film and the top magnetic film have respectively a bottom pole portion and a top pole portion facing each other via the gap film having a very small thickness, and a writing operation is performed by these bottom pole portion and top pole portion.

The bottom magnetic film and the top magnetic film are magnetically coupled with each other at the opposite side to the abovementioned bottom pole portion and top pole portion to form a magnetic circuit. This magnetically coupled portion is called also a back gap portion. The thin film coil is formed such that the coil is wound around the back gap portion.

In order to attain a high recording density using a thin film magnetic head of this kind, it is necessary to increase an amount of data to be recorded in unit area (surface recording density) of a magnetic disk. The surface recording density is governed by the ability of the writing element. The surface recording density can be improved by making small the gap length between the bottom pole portion and the top pole portion in the writing element. However, since shortening the gap length causes a reduction in the intensity of a magnetic flux passing through these pole portions, it is naturally limited.

Another means for improving the surface recording density is to increase the number of data tracks recordable on the magnetic disk. The number of data tracks recordable on a magnetic disk is usually represented by TPI (Tracks Per Inch).

The TPI of the writing element can be increased by making small a head size determining a width of a data track. The head size is usually called a track width of head.

Since an inductive type thin film magnetic head element performs the writing operation in the bottom and top pole portions facing each other via the gap film having a very small thickness, in order to reduce the track width of head determining a width of a data track, it is necessary to reduce a width (a size of the pole portion measured in parallel with the gap) of at least one of the bottom pole portion and the top pole portion.

In case of forming a pole portion, up to now, a photoresist film is formed and then a cut-out pattern is formed therein by a photolithography process. Next, a magnetic film containing a desired pattern of the pole portion is formed in the cut-out pattern by means of an electroplating and the like. Therefore, the accuracy of the pattern of the magnetic film including the pole portion is influenced by the performance of the photoresist film, and the resolution, focus and the like of an exposure light source. Heretofore, the head size of he pole portion has been made narrow and small by selecting a high-performance material as photoresist and shortening a wavelength of the exposure light source. However such a known method could not make a width of the pole portion smaller than a limit size determined by the optical performance of an exposing apparatus used in a photolithography process.

Furthermore, since the photoresist film is formed to have a substantially constant thickness, as a track width of head determining a width of a data track becomes smaller, the aspect ratio (height/width) of a height (thickness) of the photoresist film to a width of the cut-out pattern becomes larger. When this aspect ratio becomes large, even if a high-performance photoresist material is utilized and an exposure light source having a short wavelength is used, the cut-out pattern could not be accurately formed. In such a way, in the conventional manufacturing method, it has been considered that there would be a limit to make narrow and small a track width of head and a thin film magnetic head having a track width of 1 μm or less is difficult to obtain.

Moreover, in the thin film magnetic head of the kind mentioned above, the insulating film supporting the thin film coil in such a condition that the thin film coil is supported in an insulated and isolated manner, forms a step having an abruptly increasing height. Due to this step, in a photolithography process for forming the top yoke, a photoresist is liable to be deposited have a large thickness at said step. Therefore, the top pole portion has to be formed by patterning a very thick portion of the photoresist deposited on a root of the step, and thus the aspect ratio becomes remarkably high. Due to this, a reduction in a size of the track width of head has a certain limitation.

A technique of minimizing the track width of pole portion by applying an ion beam milling process has been known. However, it is difficult to attain a track width of 1 μm or less even by using such a technique. Moreover, it is difficult to mill vertically both side walls of the pole portion viewed in a direction of the track width of pole portion and both side walls are liable to form tapered faces spreading slightly wider toward the bottom. When the pole portion has such tapered faces, a problem of side fringing occurs.

In order to prevent the side walls of the pole portion from being tapered, a method of irradiating the side walls with an ion beam at a certain angle is disclosed in the specification of U.S. Pat. No. 5,438,747 issued to Krounbi et al., on Aug. 8th, 1995. However, since this method could not easily form vertical side walls of the pole portion, it is difficult to manufacture a thin film magnetic head having a track width of 1 μm or less.

In addition to the above described method of forming the pole portion of the inductive type thin film magnetic head, in a method of forming a wiring pattern in various circuit elements, integrated circuits or the like, after a photoresist film has been formed on a substrate, a cut-out pattern is formed by a photolithography process and a wiring metal film having a given pattern defined by the cut-out pattern is formed. Also in such a method, it is difficult to make a line width of a metal film smaller than a limit size determined by the optical performance of an exposing apparatus used in the photolithography process. And such a problem occurs in the same way not only in case of forming a metal film pattern but also in case of forming a thin film pattern of another material.

SUMMARY OF THE INVENTION

An object of the present invention is to provide a method of forming a thin film pattern, said method being capable of forming a thin film pattern, particularly, a metal film pattern whose width is set at a very small value in high accuracy.

Another object of the present invention is to provide a method of forming a thin film pattern, said method being capable of forming a thin film pattern, particularly, a metal film pattern whose width is more narrow and smaller than the limit of an exposing apparatus used in a photolithography process.

Another object of the present invention is to provide a method of forming a thin film pattern, said method being capable of forming a thin film pattern, particularly, a metal film pattern having vertical side walls.

Another object of the present invention is to provide a method of forming a pole portion of a thin film magnetic head, said method being capable of forming a pole portion of an inductive type thin film magnetic head whose track width is set at a very small value in high accuracy, at a very small value exceeding the limit of an exposing apparatus according to necessity, or particularly at a very small value of 1 μm or less.

A further object of the present invention is to provide a method of forming a pole portions of an inductive type thin film magnetic head, said pole portion having vertical side walls.

Another object of the present invention is to provide a method of manufacturing a thin film magnetic head, said method being capable of manufacturing an inductive type thin film magnetic head in which a track width of pole portion can be set at a very small value in high accuracy.

Another object of the present invention is to provide a method of manufacturing a thin film magnetic head, said method being capable of forming a pole portion having a track width narrower or smaller than a limitation due to an exposing apparatus.

Another object of the present invention is to provide a method of manufacturing a thin film magnetic head, said method being capable of forming a pole portion with a track width having a very small value of 1 μm or less.

A still another object of the present invention is to provide a method of manufacturing a thin film magnetic head, said method being capable of forming a pole portion having vertical side walls.

According to the present invention, a method of forming a thin film pattern comprises the steps of:

forming a dummy pattern film on a substrate, said dummy pattern film having a shape corresponding to a shape of a desired thin film pattern to be finally formed on the substrate;

forming a frame film around the dummy pattern film;

removing said dummy pattern film to form a depressed portion having a shape corresponding to the shape of the dummy pattern film in said frame film;

forming a desired thin film pattern in the depressed portion formed in the frame film.

Furthermore, according to the present invention, a method of forming a metal film having a desired pattern comprises the steps of:

forming a first resist frame on a substrate whose at least one surface is electrically conductive, said first resist frame having a shape corresponding to said desired pattern of the metal film;

depositing a metal-plated film around said first resist frame by an electroplating process using said electrically conductive surface of the substrate as an electrode;

removing said first resist frame with said metal-plated film being remained to form a depressed portion having a shape corresponding to said shape of the first resist frame; and forming a metal film having said desired pattern within the depressed portion formed by removing said first resist frame.

In this way, in the methods of forming a metal film according to the present invention, the first resist frame with the pattern corresponding to the desired pattern is first formed on a substrate. In comparison with a case of forming a cut-out pattern in a resist film or a case of an ion beam milling process, this process can reduce the width or adjust the shape of the first resist frame by applying an ashing process to it. Then, it is possible to make the resist width more narrow and smaller in the first resist frame than a limitation imposed by an exposing apparatus. Additionally, it is possible to make vertical the side walls of the first resist frame. When the substrate is made of an electrically insulating material, an electrically conductive film may be applied on the surface for the later electroplating process.

Next, the metal-plated film is formed around said first resist frame. Next, the first resist frame is removed while said metal-plated film is remained. Due to this, the desired pattern can be formed by removing the first resist frame. In the conventional method, said pattern is formed as the cut-out pattern of the photoresist film. The depressed portion obtained by removing the first resist frame has a shape which is obtained by duplicating the shape of the first resist frame, and therefore the depressed portion has an accurately defined shape and its side walls are optimized as vertical walls.

Next, the metal film is formed within the depressed portion formed by removing the first resist frame. As described above, since the depressed portion formed by removing the first resist frame has the shape which is a duplication of that of the first resist frame and has the vertical side walls, the width (line width) of the metal film formed within said depressed portion can be made smaller than the limitation imposed by the exposing apparatus. Additionally, the side walls of the metal film can be made vertical.

It is particularly preferable that before forming the metal film within the depressed portion obtained by removing the first resist frame, a second resist frame having an opening which surrounds the depressed portion formed by removing said first resist frame and is communicated or aligned with the depressed portion is formed on the metal-plated film, and then the metal film is formed within a space defined by the depressed portion as well as the opening formed in the second resist frame. Such a second resist frame has a function of preventing the metal film from being formed on the metal-plated film upon forming the metal film by plating, and can make the aspect ratio of the metal film higher by forming the metal film such that the not only the depressed portion formed in the metal-plated film is filled with the metal, but also at least a part of the opening formed in the second resist frame is filled with the metal. Furthermore, by making a size of the opening formed in the second resist frame larger than a size of the depressed portion formed in the metal-plated film, it is possible to form a metal film having a T-shaped cross section, and such a structure is particularly useful as the structure of a pole in a thin film magnetic head.

The present invention also relates to a method of forming a pole portion of an inductive type thin film magnetic head. In a method of forming a pole portion of an inductive type thin film magnetic head according to the present invention, first a first resist frame is formed on a substrate at least a surface of which is electrically conductive, a shape of said first resist film corresponding to a desired pattern of a pole portion to be finally formed. According to this process, differently from a case of forming a cut-out pattern in a resist film or a case of an ion beam milling process, it is possible to make a width of the first resist film more narrow and to adjust its shape by an ashing process. Therefore, the first resist frame can have a high aspect ratio and a width of the resist frame can be made more narrow and smaller than the limitation imposed by an exposing apparatus. Concretely, a width of the resist frame can be set at a very small value of 1 $\mu$m or less. Additionally, the first resist frame having a very small size can have vertical side walls.

Next, after a metal-plated film has been formed by electroplating around said first resist frame, said first resist frame is removed and a depressed portion is formed in the metal-plated film. In this manner, a desired pattern which has been by a cut-out pattern of a photoresist film in the conventional method can now be formed as the depressed portion obtained by removing the first resist frame, and since the depressed portion has a shape which is a duplication of the shape of the first resist frame, the depressed portion can have a very small width and can have vertical side walls.

Next, a magnetic film constituting a pole portion is formed within said depressed portion obtained by removing the first resist frame. In this way, it is possible to form the pole portion having a very small width which is smaller than the limitation imposed by an exposing apparatus, and having vertical side walls. Concretely, the width of a pole portion can be set at a very small value of 1 $\mu$m or less.

An aspect ratio of the pole portion may be further increased by carrying out an additional process, in which before forming the magnetic film within the depressed portion obtained by removing the first resist frame, a second resist frame having an opening which surrounds the depressed portion obtained by removing the first resist frame is formed on the metal-plated film and said magnetic film is formed within the depressed portion of the first resist frame as well as within the opening of the second resist frame. It should be noted that by making a size of the opening formed in the second resist frame larger than a size of the depressed portion formed in the metal-plated film, it is possible to form a pole portion having a T-shaped cross section.

The present invention also relates to a method of manufacturing a thin film magnetic head having at least a writing inductive type thin film magnetic head element. An inductive type thin film magnetic head element to be formed by the method of the present invention comprises a first magnetic film having a first pole portion, a gap film, a second magnetic film with a second pole portion which is faced with the first pole portion of said first magnetic film via said gap film, said second magnetic film being magnetically coupled with said first magnetic film at a back gap part opposite to said second pole portion, and a thin film coil having a portion passing through a magnetic path formed by said first and second magnetic films.

According to the invention, in a method of manufacturing such a thin film magnetic head, after forming said first magnetic film and said gap film, a first resist frame having a pattern corresponding to a pattern of the second magnetic film is formed on said gap film. According to this process, differently from a case of forming a cut-out pattern in a resist film or a case of an ion beam milling process, it is possible to reduce a width of the pattern of the first resist frame more narrow and to adjust the shape of the first resist frame by an ashing process and the like. Therefore, it is possible to make the aspect ratio high and make the width more narrow and smaller than the limitation imposed by an exposing apparatus. Concretely, a width of the resist frame in a pole portion can be set at a very small value of 1 $\mu$m or less, and the side walls can be made vertical. When the gap film is made of an electrically insulating material, an electrically conductive film which is required in a later electroplating may be deposited on the gap film.

Next, after depositing a metal-plated film around the first resist frame by the electroplating, a depressed portion is formed in the metal-plated film by removing the first resist frame. Then, a desired pattern which has been formed by a cut-out pattern of a photoresist film in the conventional method can now be formed as the depressed portion obtained by removing the first resist frame, and since the depressed portion has a shape which is a duplication of the shape of the first resist frame, the depressed portion can have a very small width and can have vertical side walls.

Next, a second magnetic film including a second pole portion is formed within the depressed portion formed by removing the first resist frame. The pattern of the depressed portion formed by removing the first resist frame has the shape which is a duplication of that of the first resist frame and the side walls are vertical. Accordingly, the pattern of the second magnetic film formed within the depressed portion also corresponds to the pattern of the first resist frame, and a width of the second pole portion can be made more narrow and smaller than the limitation imposed by an exposing apparatus. Concretely, a width of the second pole portion can be set to a very small value of 1 $\mu$m or less. Additionally, the side walls of the second pole portion can be made vertical.

Before forming the second magnetic film within the depressed portion obtained by removing the first resist frame, an additional process may be performed such that a second resist frame having an opening which surrounds the depressed portion obtained by removing the first resist frame is formed on the metal-plated film and said second magnetic film can be formed within the depressed portion formed in said metal-plated film as well as within the opening formed in the second resist frame.

In the method of manufacturing a thin film magnetic head according to the present invention, a reading magnetoresistive element may be formed in addition to the writing inductive type thin film magnetic head element. The reading magnetoresistive element comprises a first shield film, a second shield film, and an MR film which is embedded in a shield gap film between the first shield film and the second shield film. In the method of manufacturing a thin film magnetic head according to the present invention, the magnetoresistive element may be first formed on the substrate, and then the inductive type thin film magnetic head element may be formed on the magnetoresistive element, or the inductive type thin film magnetic head element may be first formed on the substrate and then the magnetoresistive element may be formed on the inductive type thin film magnetic head.

BRIEF DESCRIPTION OF THE DRAWINGS

FIGS. 1 to 8 are cross sectional views showing successive steps of an embodiment of the method of manufacturing a thin film pattern according to the present invention;

FIG. 10 is a cross sectional view cut along a line 10—10 in FIG. 9;

FIG. 11 is an enlarged perspective view of the pole portion of the thin film magnetic head shown in FIGS. 9 and 10;

FIGS. 12 to 19 are cross sectional views depicting successive steps of an embodiment of the method of manufacturing a pole portion according to the present invention;

FIGS. 21 to 32 are cross sectional views illustrating successive steps of another embodiment of the method of the present invention for manufacturing the pole portion shown in FIG. 20.

DESCRIPTION OF THE PREFERRED EMBODIMENTS

FIGS. 1 to 8 are drawings showing diagrammatically successive steps of an example of the method of forming a metal film according to the present invention. First, as shown in FIG. 1, a substrate 110 having an electrically conductive film 120 stacked on the surface thereof is prepared. The substrate 110 is determined depending upon a device to be formed by this process. As a material for the substrate 110 an organic insulating material, an inorganic insulating material, a non-magnetic material or the like may be optionally selected. In this example, the substrate 110 is made of an inorganic insulating material and the electrically conductive film 120 is applied on the surface of the substrate. The electrically conductive film 120 is formed by a metal film and is prepared for a later electroplating process. As described above, the substrate 110 may be made of an electrically conductive material, and in this case the electrically conductive film can be omitted.

Next, as shown in FIG. 2, a first resist frame 410 is formed on the electrically conductive film 120 stacked on the surface of the substrate 110. The first resist frame 410 is obtained by an ordinary photolithography process. The first resist frame 410 has a pattern corresponding to a desired pattern of a metal film to be obtained.

According to this process, in comparison with the conventional methods in which a desired pattern is formed by cut-out pattern formed in a resist film or by an ion beam milling process, a width WO1 or a height HO1 of the first resist frame 410 can be reduced or a shape of the first resist frame can be adjusted by anashing process. Therefore, the width WO1 of the resist frame can be made more narrow and smaller than a limitation imposed by an exposing apparatus used for the photolithography. Moreover, side walls of the first resist frame 410 can be made vertical.

Figure 3:
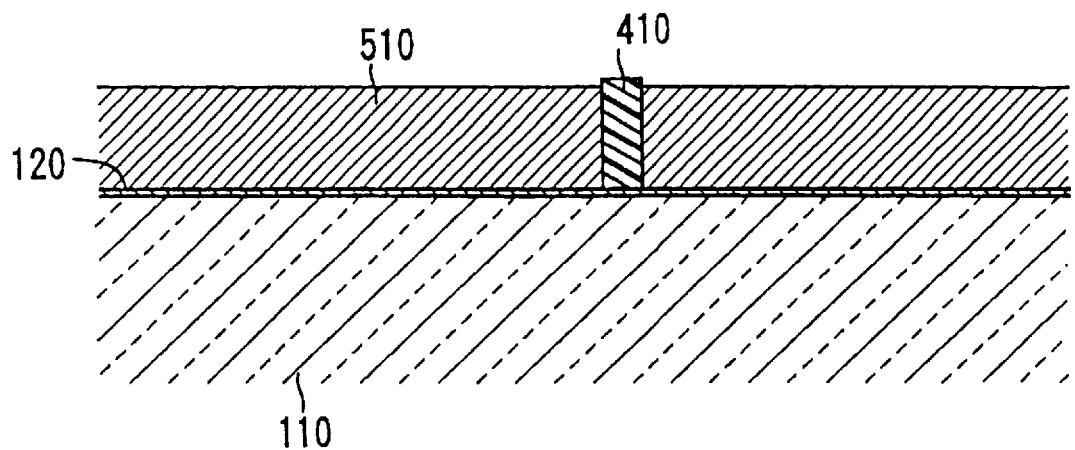

Next, as shown in FIG. 3, a metal-plated film 510 is deposited around the first resist frame 410. The metal-plated film 510 is formed by the electroplating. The metal-plated film 510 is made of a material which may be selectively etched with respect to a metal film to be formed later.

Figure 4:
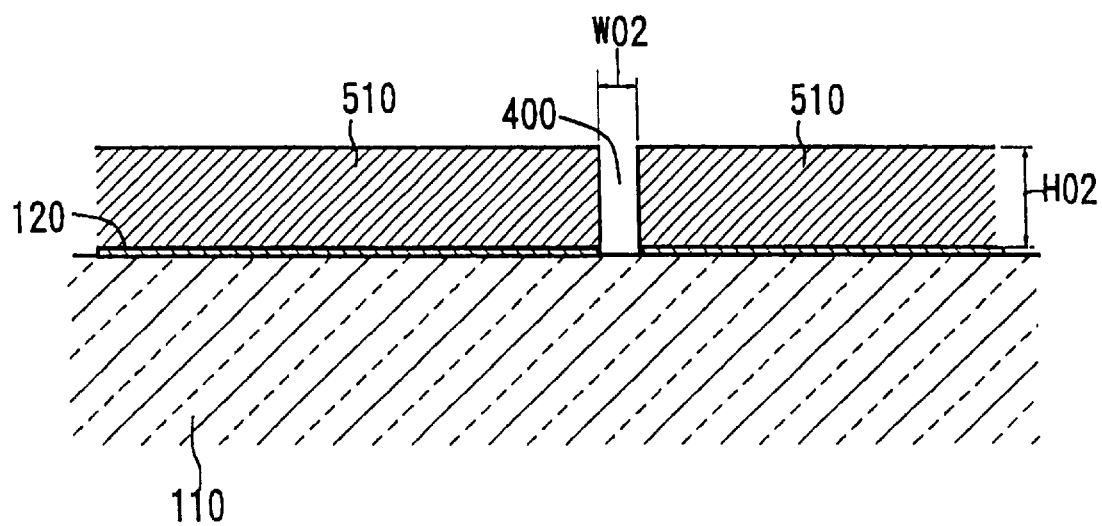

Next, as shown in FIG. 4, the first resist frame 410 is removed while the metal-plated film 510 is remained. Then, a pattern which has been formed up to now as a cut-out pattern of a photoresist film by a photolithography process is now obtained by a depressed portion (cut-out pattern) 400 obtained by removing the first resist frame 410. The depressed portion has a shape which is a duplication of that of the first resist frame 410. The first resist frame 410 can be easily removed by a chemical etching process using an ordinary resist remover.

Figure 5:
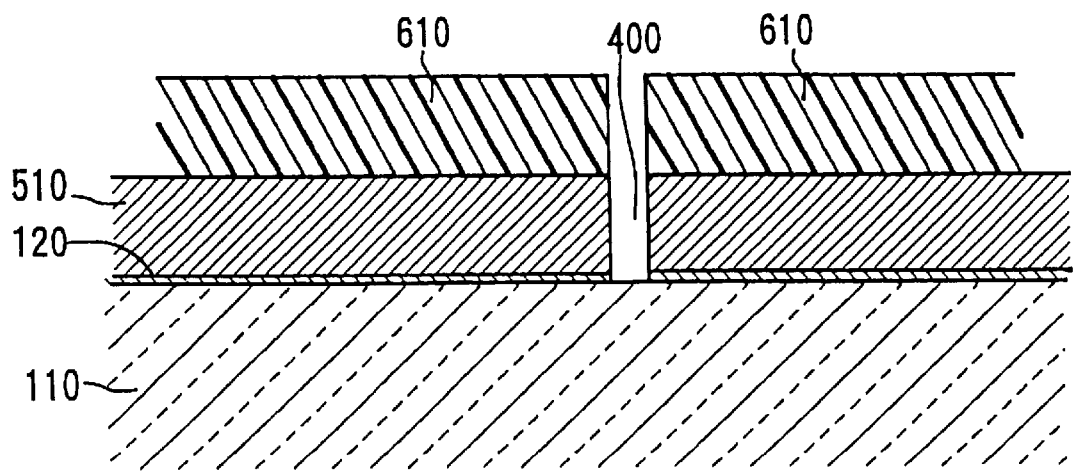

Next, as shown in FIG. 5, a second resist frame 610 is formed on the metal-plated film 510 to be aligned with the depressed portion 400 using a mask coinciding with the shape of the depressed portion 400 obtained by removing the first resist frame 410. Therefore, an opening communicated with the depressed portion 400 is formed also in the second resist frame 610. Hereinafter, the depressed portion and opening are called a depressed portion 400.

Figure 6:
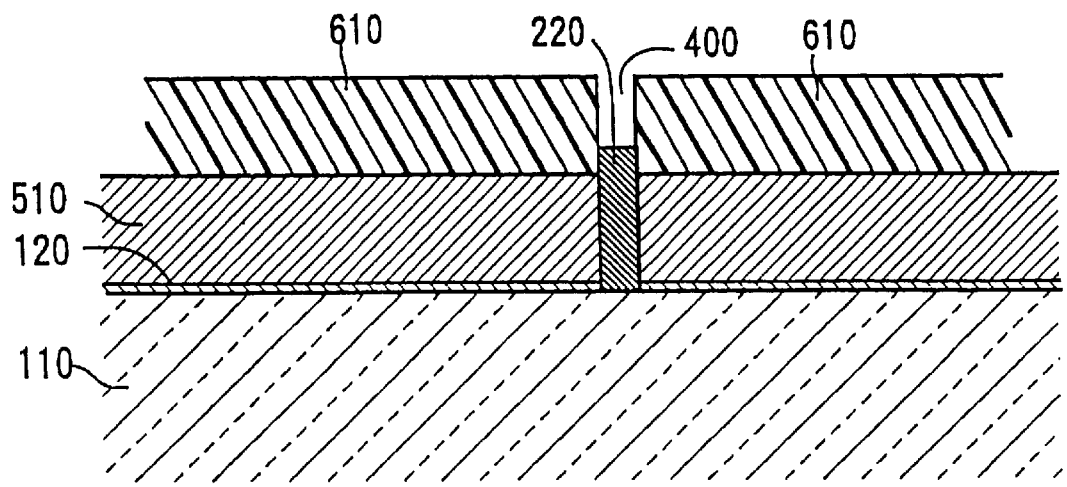

Next, as shown in FIG. 6, a metal film 220 is formed within the depressed portion 400 surrounded by the metal-plated film 510 and the second resist frame 610. At the time of forming the metal film 220 by an electroplating process using the metal-plated film 510 as an electrode, the second resist frame 610 serves as a mask for preventing the metal film 220 from being deposited on a portion other than the depressed portion 400. As described already, since the depressed portion 400 formed in the metal-plated film 510 by removing the first resist frame 410 has the pattern which is obtained by transferring the pattern of the first resist frame 410 to the metal-plated film, a width WO2 of the metal film 220 formed within the depressed portion 400 can be set at a very small value exceeding the limitation imposed by the exposing apparatus. Moreover, the metal film 220 can have sharply defined vertical wall faces. Furthermore, since the metal film 220 can be formed thicker in thickness than the metal-plated film 510 by forming the second resist frame 610 on the metal-plated film 510, its aspect ratio can be made very high.

Figure 7:
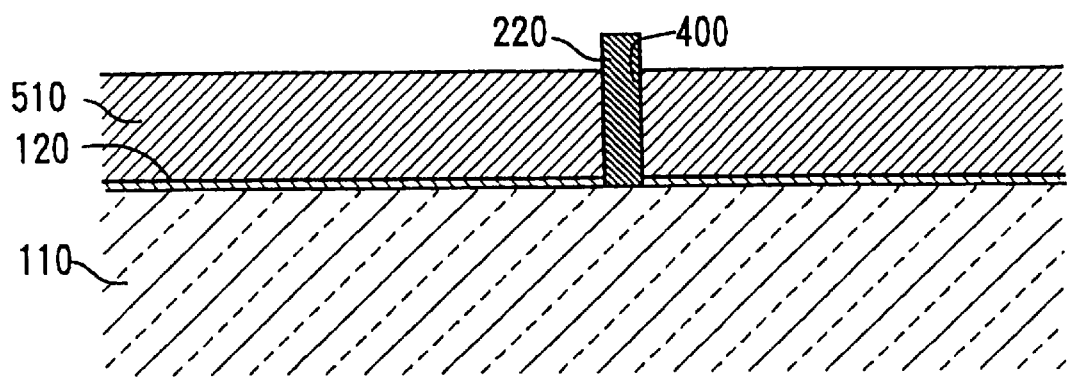

Next, as shown in FIG. 7, the second resist frame 610 is removed. The second resist frame 610 also can be easily removed by a chemical etching process using an ordinary resist remover.

Figure 8:
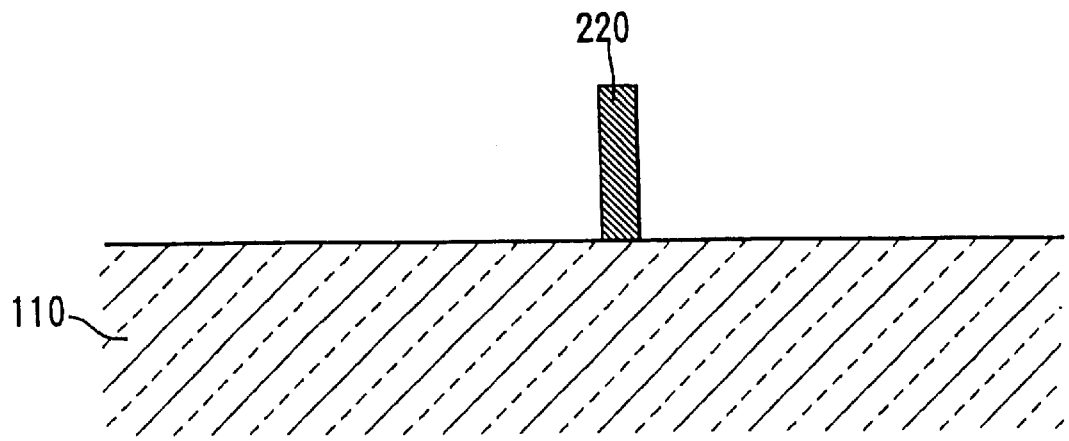

Next, as shown in FIG. 8, the metal-plated film 510 is removed to leave the metal film 220. Materials for the metal-plated film 510 and the metal film 220 are selected such that the selective etching can be performed. It should be noted that the metal-plated film 510 may be remained instead of being removed.

Next, the method of forming a pole of a thin film magnetic head and the method of manufacturing a thin film magnetic head according to the present invention will be described.

Figure 9:
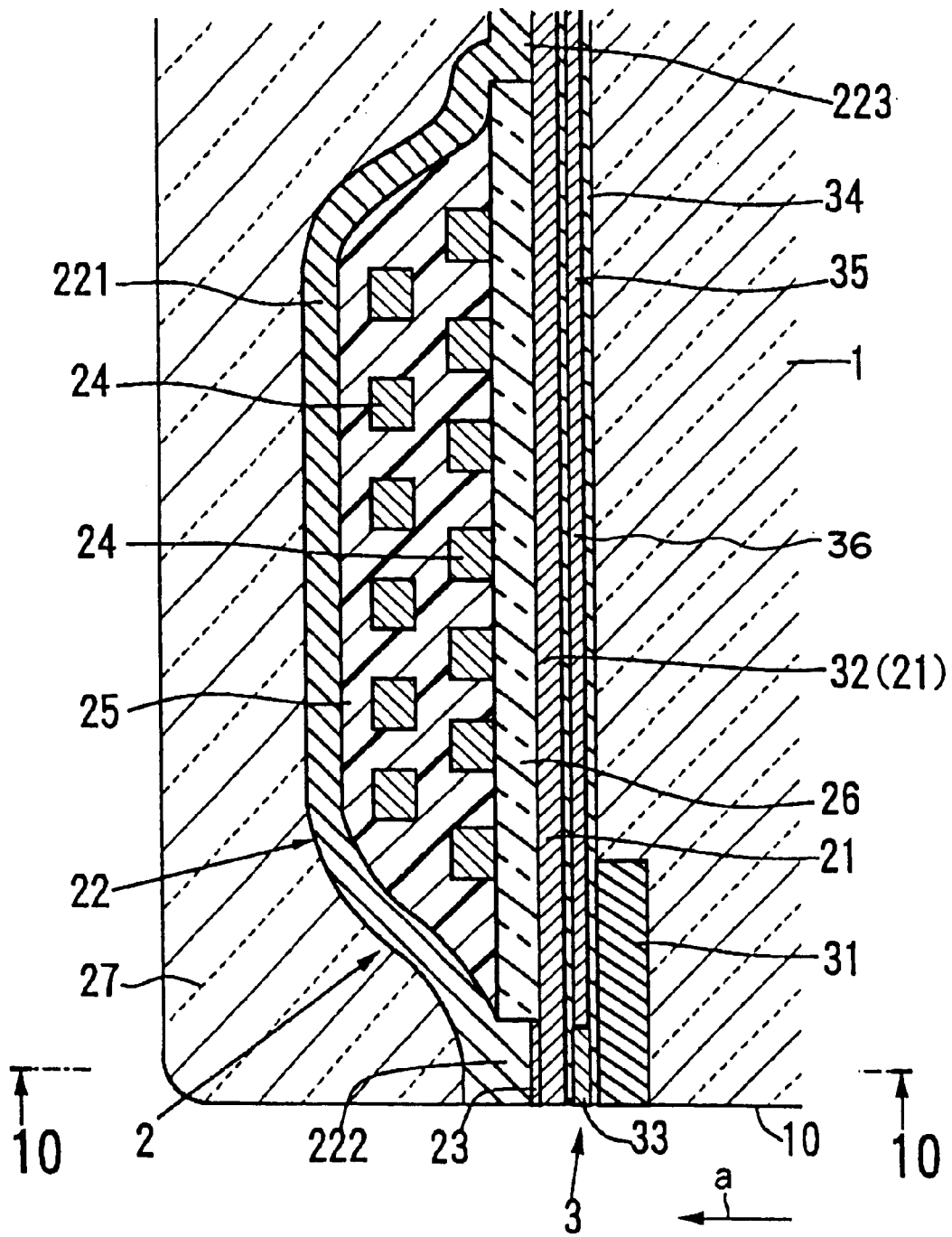
FIG. 9 is a cross sectional view illustrating a thin film magnetic head manufactured by the method according to the present invention.

FIG. 9 is a cross sectional view of a thin film magnetic head to be formed by the method according to the present invention, FIG. 10 is a cross sectional view cut along a line 10—10 in FIG. 9, and FIG. 11 is an enlarged perspective view of a pole portion of the thin film magnetic head shown in FIGS. 9 and 10. In these figures, a relationship in dimensions of various portions is not correspond to a relationship in dimensions of an actual thin film magnetic head. The thin film magnetic head of the present embodiment is a combination type thin film magnetic head having a writing inductive type thin film magnetic head element 2 and a reading magnetoresistive element 3 stacked one on the other. The writing inductive type thin film magnetic head element 2 and the reading MR element 3 are formed on a substrate 1 to be used as a slider and these elements are located on the substrate 1 on a side of an air bearing surface (hereinafter referred to as ABS) 10. An arrow a indicates the direction of an air flow generated by the rotation of a magnetic record medium.

The writing inductive type thin film magnetic head element 2 is stacked on the reading MR element 3. However, a structure in which the reading MR element 3 is stacked on the writing inductive type thin film magnetic head element 2 may be also adopted. The inductive type thin film magnetic head element 2 comprises a first magnetic film 21, a second magnetic film 22, a gap film 23 and a thin film coil 24 supported by an insulating film 25 made of an organic resin. The first magnetic film 21 comprises a first yoke portion 211 and a first pole portion 212. The gap film 23 may be made of an insulating non-magnetic material such as $Al_2O_3$, or may be made of an electrically conductive non-magnetic material.

The second magnetic film 22 comprises a second pole portion 222 and a second yoke portion 221. The second pole portion 222 is stacked on the gap film 23 which is deposited on the first pole portion 212, and has a track width W21. The track width W21 may be set to a very small value of 1 µm or less for example and the height H21 of the second pole portion 222 may be set to a value several times larger than the track width W21. Therefore, the aspect ratio is very large. A portion of the first magnetic film 21 facing with the second pole portion 222 and having a track width W21 acts as an actual first pole portion 212.

The second pole portion 222 is surrounded by a non-magnetic insulating film 26. As the non-magnetic insulating film 26, $Al_2O_3$ or the like may be used. A reference numeral 27 denotes a protection film which covers the whole and is made of $Al_2O_3$ or the like. The non-magnetic insulating film 26 and the protective film 27 may be formed simultaneously.

The top portion of the second yoke portion 221 has a track width W22 which is wider than the track width W21 of the second pole portion 222. However, the width W22 of the top portion of the second yoke portion 221 may be the same as the track width W21 of the second pole portion 222. The second yoke portion 221 is continuously formed with the second pole portion 222 and is made of the same material as the second pole portion 222, for example, permalloy. The insulating film 25 supporting the thin film coil 24 is formed on the upper surface of the non-magnetic insulating film 26.

The first magnetic film 21 and the second magnetic film 22 are coupled with each other so that their yoke portions 211 and 221 constitute a magnetic circuit in a coupling portion 223 at a portion which is opposite to the first and second pole portions 212 and 222. The thin film coil 24 is formed on the insulating film 25 such that its coil windings are spirally wound around the coupling portion 223. The number of coil windings and the number of layers of the thin film coil 24 are optional.

The reading MR element 3 comprises a first shield film 31, a second shield film 32, an MR film 33 and a lead conductor film 35. The first shield film 31 and the second shield film 32 are disposed with a spacing formed therebetween, and the MR film 33 and the lead conductor film 35 are disposed between the first and second shield films 31 and 32. The second shield film 32 forms the first yoke portion 211 of the inductive type thin film magnetic head element 2. The MR film 33 and the lead conductor film 35 are embedded in first and second shield gap films 34 and 36.

Next, with reference to FIGS. 12 to 19, the method of forming a pole portion of the thin film magnetic head shown in FIGS. 9 to 11 will be described. In an actual manufacturing method, a number of thin film magnetic heads are formed on a wafer at the same time, but the figures show a process of manufacturing a single thin film magnetic head.

First, as shown in FIG. 12, after forming the respective portions of the magnetoresistive element 3 on the substrate 1, the first magnetic film 21 and gap film 23 are formed. The first magnetic film 21 is formed by plating a permalloy, for example. The gap film 23 may be formed by sputtering an insulating non-magnetic material such as $Al_2O_3$, $SiO_2$ or the like.

Next, as shown in FIG. 13, a first resist frame 4 corresponding to the pattern of the second magnetic film 22 is formed on the gap film 23. According to this process, in comparison with the conventional method using a cut-out pattern formed in a resist film or an ion beam milling process, it is possible to apply an ashing process to the first resist frame 4, and thereby the width of the first resist frame 4 can be more narrow and smaller and the shape of the first resist frame can be adjusted. Therefore, it is possible to reduce the resist width (WO1) of the first resist frame 4 smaller than the limitation imposed by an exposing apparatus. Concretely, the resist width (WO1) may be a very small value of 1 µm or less. Moreover, the side walls of the first resist frame 4 having a very small width may be vertical. When the gap film 23 is made of an electrically insulating material, an electrically conductive film has to be deposited on the gap film 23 for a later electroplating.

Next, as shown in FIG. 14, the metal-plated film 5 is stacked around the first resist frame 4. The metal-plated film 5 is formed by the electroplating or the like. The metal-plated film 5 is made of a material capable of being selectively etched between it and the second magnetic film 22 to be formed later. For example, when the second magnetic film 22 is made of a permalloy, the metal-plated film 5 may be made of Cu, for example.

Next, as shown in FIG. 15, a depressed portion 40 is formed by removing the first resist frame 4 while the metal-plated film 5 is remained. In the known method, the pattern is formed by means of the cut-out pattern formed in the photoresist film by the photolithography process, according to the invention, the desired pattern can be formed by the depressed portion 40 which is formed by removing the first resist frame 4. The depressed portion 40 obtained by removing the first resist frame 4 has a shape which is a duplication of that of the first resist frame 4. The first resist frame 4 may be removed by a chemical etching process using an ordinary resist remover.

Next, as shown in FIG. 16, a second resist frame 6 is formed on the metal-plated film 5 to surround the depressed portion 40 obtained by removing the first resist frame 4. The second resist frame 6 is used for forming an outer peripheral pattern of the second magnetic film 22 to be formed later.

Next, as shown in FIG. 17, the second magnetic film 22 is formed within an area surrounded by the second resist frame 6. As described above, the shape of the depressed portion 40 obtained by removing the first resist frame 4 has been formed by transferring the shape of the first resist frame 4. The second magnetic film 22 is formed in the area including the depressed portion 40. Therefore, the width WO2 of the second pole portion 222 contained in the pattern of the second magnetic film 22 is set to a very small value of 1 $\mu$m or less beyond the limitation imposed by the exposing apparatus. Moreover, the second pole portion 222 has sharply defined vertical side walls.

Next, as shown in FIG. 18, the second resist frame 6 is removed. The second resist frame 6 may be removed also by the chemical etching process using an ordinary resist remover.

Next, as shown in FIG. 19, the second magnetic film 22 is left and the metal-plated film 5 is removed. The metal-plated film 5 can be made of a material capable of being selectively etched between it and the second magnetic film 22. For example, when the second magnetic film 22 is made of a permalloy, the metal-plated film 5 may be made of Cu. In this case, by using for example an ammonium persulfate solution as a selective etchant, it is possible to etch out selectively the metal-plated film only and leave the second magnetic film 22.

When the metal-plated film 5 is made of a material which is non-magnetic and has a high wear resistance, the metal-plated film may be exposed to the ABS of the thin film magnetic head. Then, the metal-plated film 5 may be remained without being removed.

Figure 20:
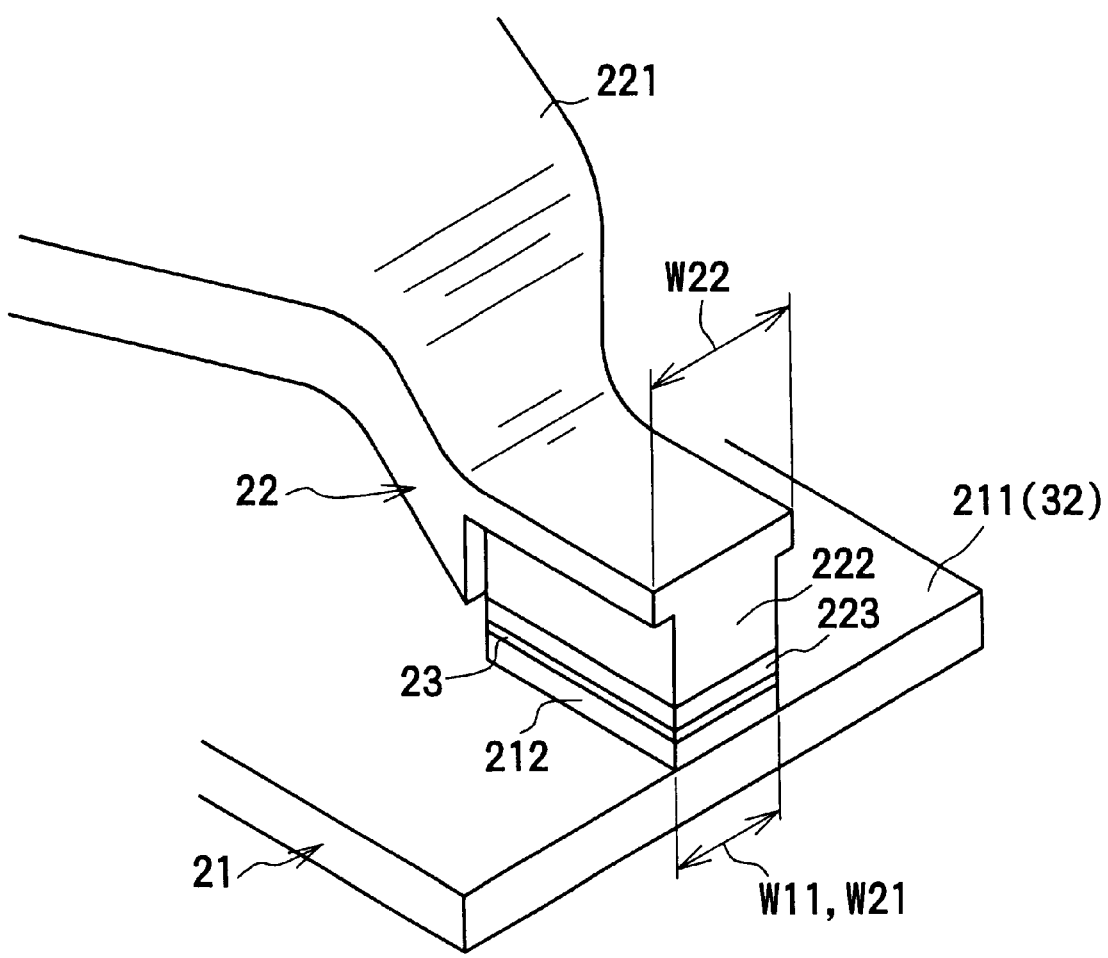
FIG. 20 is a perspective view showing another example of a pole portion to be manufactured by the method according to the present invention.

FIG. 20 is an enlarged perspective view of a pole portion of the thin film magnetic head having a structure different from the structure shown in FIG. 11.

A first magnetic film 21 comprises a first yoke portion 211 and a first pole portion 212, and the first pole portion 212 is formed so as to project over the first yoke 211. A gap film 23 is made of an electrically conductive non-magnetic material. The gap film 23 is stacked on the first pole portion 212.

A second magnetic film 22 comprises a second pole portion 222 and a second yoke portion 221. The second pole portion 222 is stacked on a magnetic film 223 which is stacked on the gap film 23. Therefore, this magnetic film 223 forms the top pole together with the second pole portion 222. The track width W21 of the second pole portion 222 is substantially equal to the track width W11 of the first pole portion 212.

The second yoke portion 221 is continuously formed with the second pole portion 222 and is made of the same material as the second pole portion 222, for example, a permalloy. The top portion of the second yoke portion 221 has a track width W22 wider than the track width W21 of the second pole portion 222.

Next, with reference to FIGS. 21 to 32, the method of manufacturing a thin film magnetic head having the pole structure shown in FIG. 21 will be described.

As shown in FIG. 21, on an insulating substrate 1, a first shield film 31 and a first shield gap film 34 are formed in this order, and thereon an MR film 33 connected to lead conductor films 35 is formed, and further thereon a second shield gap film 36 is formed, and still further thereon a second shield film 32 is formed, and thereby a reading magnetoresistive element 3 is formed.

Next, as shown in FIG. 22, a resist frame 7 is formed on the second shield film 32. The resist frame 7, which is formed by a photolithography process, has a depressed portion 71 to define a desired pattern of the pole portion to be formed. The width W31 of the depressed portion 71 defines the track width W11 or W21 of the pole portion (see FIG. 21).

Figure 23:
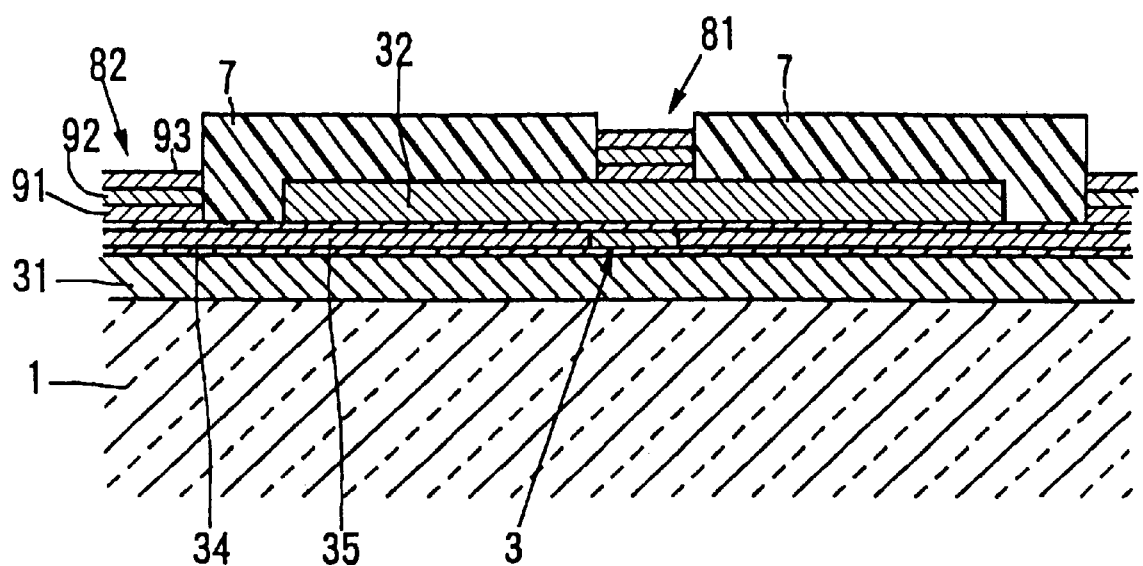

Next, as shown in FIG. 23, film stacks 81 and 82 of a magnetic film 91, a non-magnetic film 92 and a magnetic film 93 are formed within the depressed portion 71 formed in the resist frame 7 and outside the resist frame, respectively.

These can be formed by the frame plating method.

Figure 24:
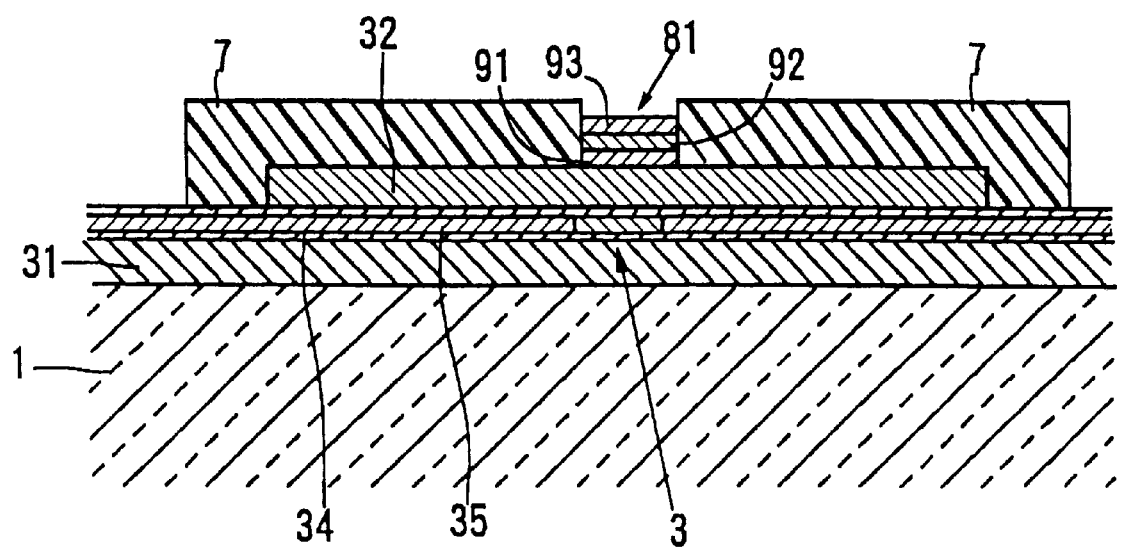

Next, as shown in FIG. 24, the film stack 82 deposited outside the resist frame is removed while the film stack 81 deposited inside the depressed portion 71 is remained. The magnetic film 91 stacked on the second shield film 32 of the film stack 81 inside the depressed portion 71 constitutes the first pole portion 212 and the non-magnetic film 92 stacked on it forms the gap film 23, and the magnetic film 93 stacked on it constitutes the magnetic film 223 forming a part of the second pole portion 222.

Furthermore, since the first pole portion 212, the gap film 23 and the magnetic film 223 of the second pole portion 222 are defined at the same time by the resist frame 7, they can be easily and accurately aligned with one another. Since the film stack 81 and resist frame 7 have a very small thickness, an aspect ratio of the depressed portion 71 is very small. Therefore, the film stack 81 can be accurately formed so as to have a very small width.

Figure 25:
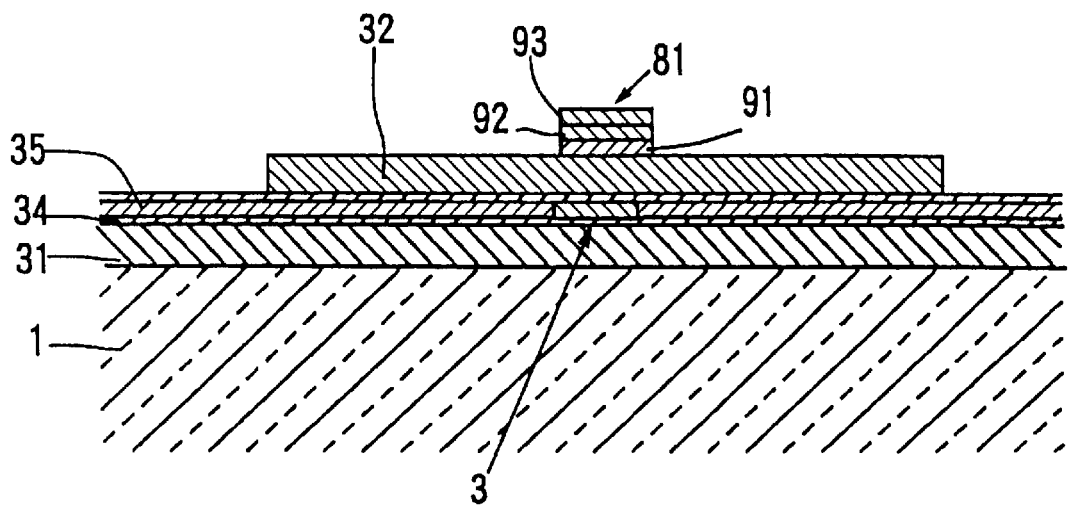

Next, as shown in FIG. 25, the resist frame 7 is removed. The resist frame 7 may be removed by an organic solvent or a resist remover.

Figure 26:
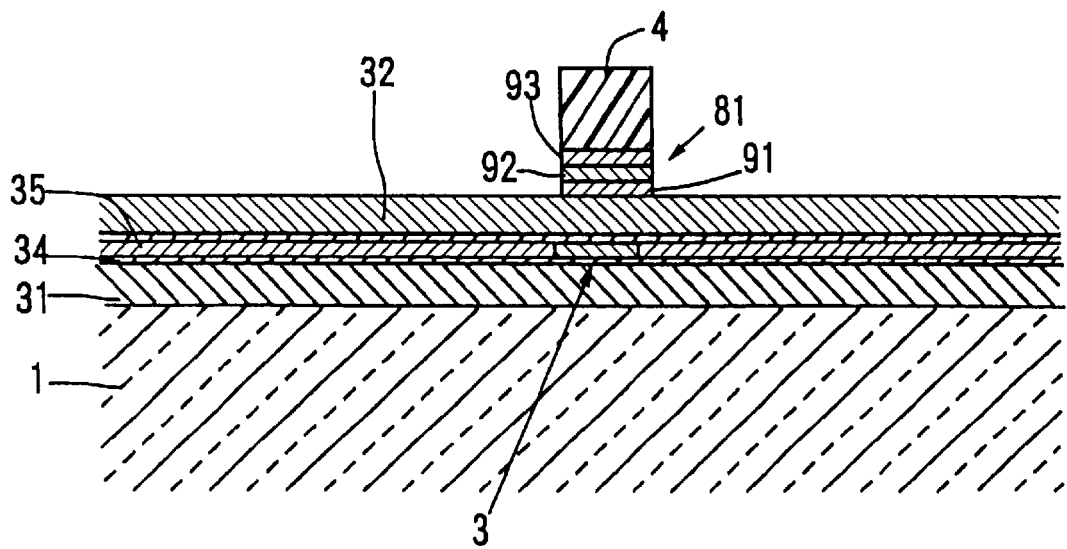

Next, as shown in FIG. 26, a first resist frame 4 corresponding to the pattern of the second magnetic film 22 is formed on the film stack 81. After the first resist frame 4 has been formed, a process for adjusting the shape of the first resist frame 4 is performed. This process includes an ashing process.

Figure 27:
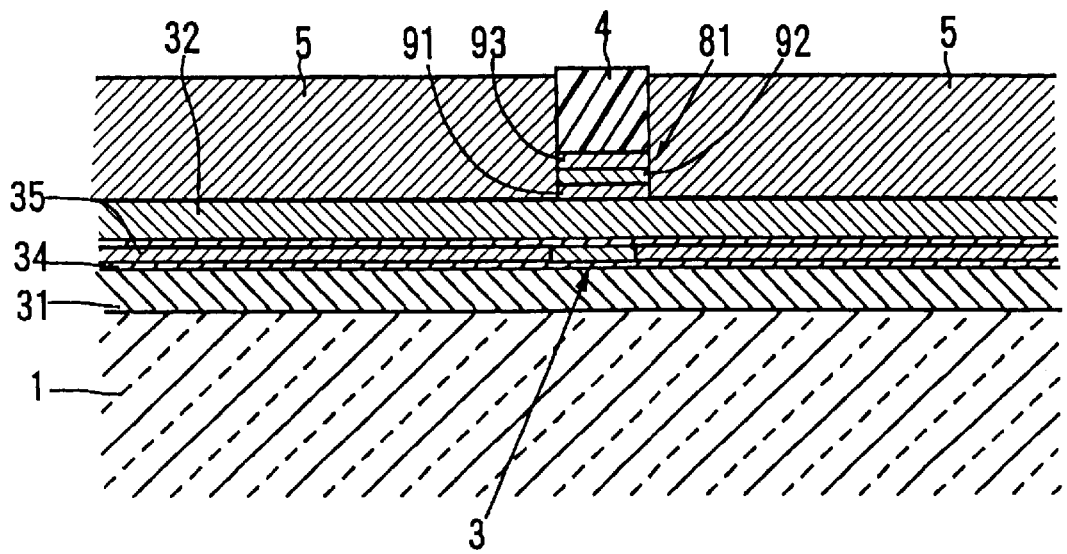
Figure 28:
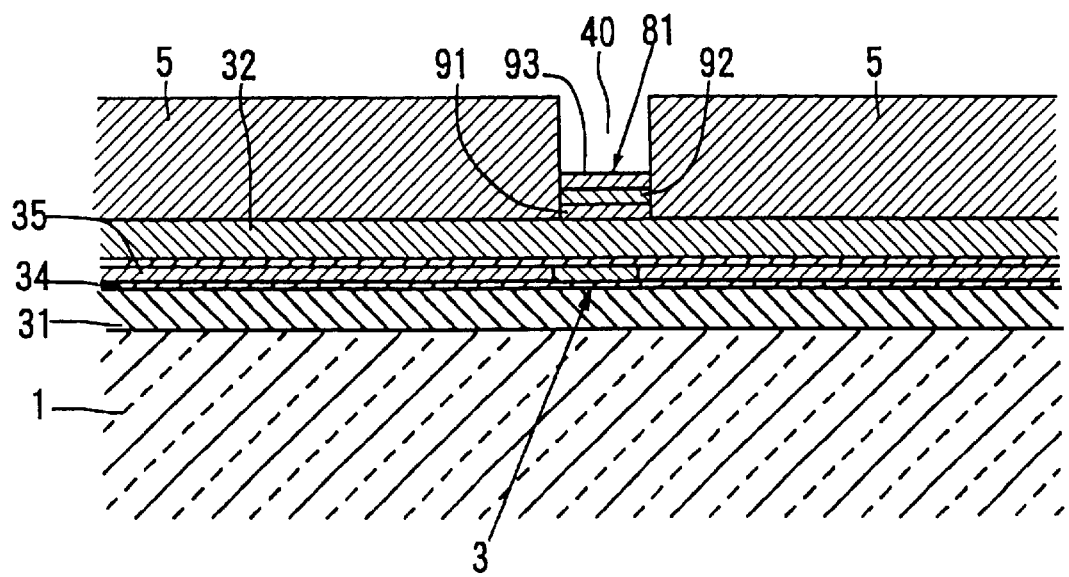

Next, as shown in FIG. 27, a metal-plated film 5 is deposited around the first resist frame 4 and then as shown in FIG. 28, the first resist frame 4 is removed with the metal-plated film 5 being remained. A depressed portion 40 formed in the metal-plated film 5 by removing the first resist frame 4 has a pattern which is a duplication of the shape of the first resist frame 4.

Next, as shown in FIG. 29, a second resist frame 6 having an opening which surrounds the depressed portion 40 obtained by removing the first resist frame 4 and is aligned with the depressed portion is formed on the metal-plated film 5. The size of the opening formed in the second resist frame is made larger than the size of the depressed portion 40 formed in the metal-plated film 5.

Next, as shown in FIG. 30, a second magnetic film 22 is formed within the depressed portion 40 formed in the metal-plated film 5 as well as within the opening formed in the second resist frame 6. Then, the width of the second pole portion 222 contained in the pattern of the second magnetic film 22 can be set to a very small value of 1 $\mu$m or less which exceeds the limitation imposed by the exposing apparatus. Moreover, the side walls of the second pole portion 222 can be made vertical.

In this manner, the second magnetic film 22 is formed to have a T-shaped cross section.

Next, as shown in FIG. 31, the second resist frame 6 is removed. The second resist frame 6 can be removed by an ordinary chemical etching process for removing resist.

Next, as shown in FIG. 32, the second magnetic film 22 is remained and the metal-plated film 5 is removed by a selective etching process. Therefore, it is possible to etch out selectively the metal-plated film 5 only and leave the second magnetic film 22.

By the above-mentioned processes, it is possible to obtain the thin film magnetic head, in which the magnetic film 91 stacked on the second shield film 32 in the film stack 81 stacked within the depressed portion 71 constitutes the first pole portion 212, and the non-magnetic film 92 stacked on the first pole portion constitutes the gap film 23, and the magnetic film 93 stacked on the gap film forms the magnetic film 223 contained in the second pole portion 222.

Although a detailed explanation is omitted, differently from the processes shown in FIGS. 21 to 25, the stacked film 81 composed of the first pole portion 212 contained in the first magnetic film 21, the gap film 23 and the magnetic film 223 contained in the second pole portion 222 may be formed by the milling or the like.

In the above-mentioned embodiments, the writing inductive type thin film magnetic head element 2 may be composed of various types which have been proposed up to now or will be proposed in the feature. Similarly the reading magnetoresistive element 3 may be formed by various types which have been proposed heretofore or will be developed in the feature. For instance, the reading magnetoresistive element 3 may be a type utilizing the anisotropic magnetoresistive effect of a permalloy film or the like and a type utilizing a giant magnetoresistive effect represented by a tunnel junction effect or a spin valve and the like. The writing inductive type thin film magnetic head element 2 and reading magnetoresistive element 3 are mounted on a slider. The slider may be of a type having no rail in addition to a type having one or more rails.

The present invention has been described with reference to the preferred embodiments, and it is apparent to persons skilled in this field that various modifications and variations may be conceived without departing from the spirit and the scope of the invention.

For instance, although the above-mentioned embodiments have been described as the method of forming the pole portion of the thin film magnetic head, said pole portion being made of a magnetic material and having a fine pattern, the invention may be applied to the formation of a high-density wiring pattern in various circuit elements, integrated circuits and the like, and also may be applied to the formation of a thin film pattern other than a metal film pattern.

Furthermore, in the embodiment shown in FIGS. 21 to 32, the film stack 81 contains the magnetic film 91 constituting the first pole portion, but this magnetic film 91 may be dispensed with. In this case a stack containing the insulating film 92 and magnetic film 93 may be formed on a flat surface of the first magnetic film 32.

In the above-mentioned embodiment, after the second resist frame has been formed on the metal-plated film, the metal film such as the magnetic film is formed by plating, but this second resist frame is not always necessary. In such a case, although the metal film is formed also on the metal-plated film, the metal film on the metal-plated film may be selectively removed by CMP or etching.

In the method of forming the thin film pattern and the method of forming the metal film pattern according to the present invention, the following merits can be obtained.

(a) A width of the thin film pattern of the metal film or the like can be accurately and exactly formed to have a very small value.

(b) A width of the thin film pattern of the metal film or the like can be made more narrow and smaller than the limitation imposed by the exposing apparatus used in the photolithography.

(c) The side walls of the thin film pattern of the metal film or the like can be made vertical.

In the method of forming the pole of the thin film magnetic head and the method of manufacturing the thin film magnetic head according to the present invention, the following advantageous effects can be obtained.

(a) The track width of the pole portion of the thin film magnetic head can be accurately and exactly formed to have a very small value.

(b) The track width of the pole portion of the thin film magnetic head can be made more narrow and smaller than the limitation imposed by the exposing apparatus.

(c) The track width of the pole portion of the thin film magnetic head can be set to a very small value of 1 $\mu$m or less.

(d) The side walls of the pole portion of the thin film magnetic head can be made vertical.

What is claimed is:

1. A method of forming a metal film pattern having a desired shape, comprising the steps of:

forming a first resist frame on a substrate whose at least one surface is electrically conductive, said first resist frame having a shape corresponding to said desired pattern of the metal film;

depositing a metal-plated film around said first resist frame by an electroplating process using said electrically conductive surface of the substrate as an electrode;

removing said first resist frame with said metal-plated film being remained to form a depressed portion having a shape corresponding to said shape of the first resist frame; and forming a metal film having said desired shape within the depressed portion formed by removing said first resist frame.

2. A method of forming a metal film pattern according to claim 1, wherein prior to forming said metal film within said depressed portion formed in said metal-plated film by removing said first resist frame, a second resist frame having an opening is formed on said metal-plated film such that the second resist frame surrounds the depressed portion obtained by removing said first resist frame and said opening is communicated with said depressed portion, and said metal film is formed within a space defined by said depressed portion formed in said metal-plated film as well as by said opening formed in said second resist frame.

3. A method of forming a metal film pattern according to claim 2, comprising a step of adjusting the shape of the first resist frame after forming the first resist frame.

4. A method of forming a metal film pattern according to claim 2, wherein a size of the opening formed in said second resist frame is equal to a size of the depressed portion formed in said metal-plated film.

5. A method of forming a metal film pattern according to claim 2, wherein a size of the opening formed in said second resist frame is larger than a size of the depressed portion formed in said metal-plated film.

6. A method of forming a metal film pattern according to claim 2, wherein said metal-plated film is made of a material different from said metal film, and said method further comprises a step of removing said second resist frame after forming said metal film, and a step of selectively etching out said metal-plated film without removing said metal film.

7. The method of forming a metal film pattern according to claim 1, wherein said first resist frame is an electrically insulating material.

8. The method of forming a metal film pattern according to claim 1, wherein the depositing of said metal-plated film does not deposit any metal-plated film upon said first resist frame.

9. A method of forming a pole portion of a thin film magnetic head comprising the steps of:
    forming a first resist frame on a substrate at least a surface of which is electrically conductive, a shape of said first resist film corresponding to a desired pattern of a pole portion to be finally formed;
    forming a metal-plated film by electroplating around said first resist frame;
    removing said first resist frame with said metal-plated film being remained to form a depressed portion in said metal-plated film, said depressed portion having a shape which is a duplication of the shape of said first resist frame;
    forming a magnetic film within said depressed portion formed in said metal-plated film by removing the first resist frame, said magnetic film constituting a pole portion.

10. A method of forming a pole portion according to claim 9, wherein prior to forming said magnetic film within the depressed portion formed in said metal-plated film by removing said first resist frame, the method further comprises a step of forming a second resist frame having an opening on said metal-plated film such that said second resist frame surrounds said depressed portion formed in said metal-plated film and said opening is communicated with said depressed portion, and a step of forming said magnetic film within a space defined by said depressed portion formed in said metal-plated film as well as by said opening formed in said second resist frame.

11. A method of forming a pole portion according to claim 10, comprising a step of adjusting the shape of said first resist frame after forming said first resist frame.

12. A method of forming a pole portion according to claim 10, comprising a step of removing said second resist frame after forming the pole portion formed by said magnetic film.

13. A method of forming a pole potion according to claim 12, wherein after removing said second resist frame, said metal-plated film is removed.

14. A method of forming a pole portion according to claim 13, wherein said metal-plated film is made of a material different from a magnetic material constituting said pole and said metal-plated film is removed by a selective etching process which does not etch the material constituting said pole.

15. A method of forming a pole portion according to claim 10, wherein said magnetic film is formed by electroplating.

16. A method of forming a pole portion according to claim 10, wherein said metal-plated film is made of a non-magnetic material.

17. A method of forming a pole portion according to claim 10, wherein a size of said opening formed in the second resist frame is larger than a size of said depressed portion formed in the metal-plated film.

18. The method of forming a pole portion of a thin film magnetic head according to claim 13, wherein the first resist frame is an electrically insulating material.

19. The method of forming a pole portion of the thin film magnetic head according to claim 9, wherein the forming of said metal plated film does not form any metal-plated film upon the first resist frame.

20. A method of manufacturing a thin film magnetic head having at least an inductive type thin film magnetic head element comprising a first magnetic film having a first pole portion, a gap film, a second magnetic film with a second pole portion which is faced with the first pole portion of said first magnetic film via said gap film, said second magnetic film being magnetically coupled with said first magnetic film at a back gap part opposite to said second pole portion, and a thin film coil having a portion passing through a magnetic path formed by said first and second magnetic films, comprising the steps of:
    forming a first resist frame having a pattern corresponding to a pattern of the second magnetic film on said gap film after forming said first magnetic film and said gap film;
    depositing a metal-plated film around the first resist frame by electroplating;
    forming a depressed portion in the metal-plated film by removing the first resist frame; and
    forming a second magnetic film within the depressed portion formed in the metal-plated film.

21. A method of manufacturing a thin film magnetic head according to claim 20, wherein before forming the second magnetic film within the depressed portion obtained by removing the first resist frame, a second resist frame having an opening on the metal-plated film such that the second resist frame surrounds the depressed portion and said opening is communicated with said depressed portion, and said second magnetic film is formed within space defined by the depressed portion formed in said metal-plated film as well as by the opening formed in the second resist frame.

22. A method of manufacturing a thin film magnetic head according to claim wherein after forming said first resist frame, the shape of said first resist frame is adjusted.

23. A method of manufacturing a thin film magnetic head according to claim 21, wherein said second magnetic film is formed by electroplating.

24. A method of manufacturing a thin film magnetic head according to claim 21, wherein after forming said second magnetic film, said second resist frame is removed.

25. A method of manufacturing a thin film magnetic head according to claim 24, wherein after removing said second resist frame, said metal-plated film is removed.

26. A method of manufacturing a thin film magnetic head according to claim 25, wherein said metal-plated film is removed by a selective etching process which does not etch said second magnetic film.

27. A method of manufacturing a thin film magnetic head according to claim 24, wherein said metal-plated film is made of a non-magnetic material and is remained after removing said second resist frame.

28. A method of manufacturing a thin film magnetic head according to claim 21, wherein said first magnetic film is formed to have a flat surface, and said gap film is formed flat on said flat surface of the first magnetic film.

29. A method of manufacturing a thin film magnetic head according to claim 21, wherein a size of the opening formed in said second resist frame is made larger than a size of the depressed portion formed in said metal-plated film.

30. A method of manufacturing a thin film magnetic head according to claim 21, wherein after forming said first magnetic film, but prior to forming said first resist frame, a stacked member is formed by stacking a non-magnetic film constituting said gap film and a magnetic film constituting a part of the second pole portion of said second magnetic film in this order, and said first resist frame is formed on said stacked member.

31. A method of manufacturing a thin film magnetic head according to claim 30, wherein the step of forming said stacked member includes a step of forming a magnetic film between said first magnetic film and said gap film to constitute said first pole portion of the first magnetic film.

32. A method of manufacturing a thin film magnetic head according to claim 30, wherein the step of forming the stacked member including the magnetic film constituting said first pole portion, the non-magnetic film constituting said gap film and the magnetic film constituting a part of the second pole portion of said second magnetic film comprises the steps of:

forming a third resist frame which has sufficiently larger thickness than that of said stacked member, wherein the third resist frame has a depressed portion corresponding to said stacked member;

stacking said magnetic film constituting said first pole portion non-magnetic film and magnetic film constituting a part of the second pole portion of said second magnetic film in this order outside said third resist frame as well as within said depressed portion; and removing the stacked film formed outside the third resist frame while the stacked film formed within the depressed portion in said third resist frame is remained.

33. A method of manufacturing a thin film magnetic head according to claim 32, wherein after removing the stacked film formed outside said third resist frame, said third resist frame is removed such that said first resist frame is formed on said stacked member so as to be aligned with the stacked member.

34. A method of manufacturing a thin film magnetic head according to claim 21, wherein a magnetoresistive element is formed before or after forming said inductive type thin film magnetic head element.

35. A method of manufacturing a thin film magnetic head according to claim 34, wherein a process of forming said magnetoresistive element comprises the steps of:

forming a first shield film so as to be supported by said substrate;

forming an MR film and a pair of lead conductor films connected to both ends of the MR film on said first shield film so as to be buried within a shield gap film; and forming a second shield film on said shield gap film.

36. A method of manufacturing a thin film magnetic head according to claim 35, wherein said magnetoresistive element is first formed on the substrate, and next said inductive type thin film magnetic head element is formed such that said second shield film constitutes the first magnetic film of said inductive type thin film magnetic head element.

37. The method of manufacturing a thin film magnetic head according to claim 20, wherein the first resist frame is an electrically insulating material.

38. The method of manufacturing a thin film magnetic head according to claim 20, wherein the depositing of the metal-plated film does not deposit any metal-plated film upon the first resist frame.

* * * * *